US012424038B1

(12) United States Patent
Rogers et al.

(10) Patent No.: US 12,424,038 B1
(45) Date of Patent: Sep. 23, 2025

(54) DOCKING STATION FOR AN ELECTROMECHANICAL GUN

(71) Applicant: Biofire Technologies Inc., Broomfield, CO (US)

(72) Inventors: Bryan Edward Rogers, Aurora, CO (US); Kai Thorin Kloepfer, Denver, CO (US); Jack Hugo Thiesen, Firestone, CO (US); Christopher James Owens, Denver, CO (US); Benjamin William Dwyer, Golden, CO (US); William Ward, Denver, CO (US); Jules Woolf Kramer, Denver, CO (US)

(73) Assignee: Biofire Technologies Inc., Broomfield, CO (US)

( * ) Notice: Subject to any disclaimer, the term of this patent is extended or adjusted under 35 U.S.C. 154(b) by 0 days.

(21) Appl. No.: 18/584,825

(22) Filed: Feb. 22, 2024

Related U.S. Application Data

(63) Continuation of application No. 17/661,013, filed on Apr. 27, 2022, now abandoned.
(Continued)

(51) Int. Cl.
*F41C 33/00* (2006.01)
*F41A 17/06* (2006.01)
(Continued)

(52) U.S. Cl.
CPC ........ *G07C 9/00563* (2013.01); *F41A 17/066* (2013.01); *F41C 27/00* (2013.01)

(58) Field of Classification Search
CPC ............ H05K 7/20; H04W 4/06; H04W 4/80; H04W 88/02; H04L 63/083;
(Continued)

(56) References Cited

U.S. PATENT DOCUMENTS 5,673,029 A 9/1997 Behl et al.
6,301,815 B1 10/2001 Sliwa
(Continued)

FOREIGN PATENT DOCUMENTS

CN 112668353 A * 4/2021

*Primary Examiner* — Dionne Pendleton
(74) *Attorney, Agent, or Firm* — Perkins Coie LLP; Andrew T. Pettit

(57) ABSTRACT

The present disclosure provides system and techniques that allow a device to be coupled with an electromechanical gun. The electromechanical gun may be physically coupled with a cradle of the device, and the electromechanical gun may be communicatively coupled with an electrical interface of the device. The device may include a display mechanism that is capable of visually conveying information, a power source configured to supply power to the display mechanism, an electrical interface configured to be coupled with an electromechanical gun so as to allow power to be directed from the power source to the electromechanical gun, and a processor configured to process incoming messages received from the electromechanical gun and transmit outgoing messages to the electromechanical gun. The processor may perform a handshake procedure with the electromechanical gun, and the processor may process the incoming messages or transmit the outgoing messages based on the handshake procedure.

10 Claims, 12 Drawing Sheets

Related U.S. Application Data

(60) Provisional application No. 63/180,613, filed on Apr. 27, 2021.

(51) Int. Cl.

| | |
|---|---|
| ***F41C 27/00*** | (2006.01) |
| ***F41C 33/06*** | (2006.01) |
| ***G07C 9/00*** | (2020.01) |

(58) Field of Classification Search

CPC . H04L 63/0853; H04L 63/0861; H04L 9/321; H04L 9/3226; H04L 9/3236; H04L 9/3247; H04L 9/3263; H04L 9/3273; H04L 9/3297; G11B 33/142; G07C 9/00563; G06F 1/20; G06F 16/21; G06F 16/2379; G06F 16/258; G06F 21/31; G06F 21/32; G06F 21/35; F41C 33/0263; F41C 33/06; B60R 7/14; F41A 17/066; F41A 17/063; F41A 17/44; F41A 17/54; F41A 23/18; F41A 17/46; F41A 17/08; F41A 9/62; F41G 1/345; F41G 1/35

See application file for complete search history.

(56) References Cited

U.S. PATENT DOCUMENTS

| | | | | |
|---|---|---|---|---|
| 7,065,642 | B2 | 6/2006 | Sandhu et al. | |
| 2017/0116432 | A1* | 4/2017 | Minoli | G06F 21/6218 |
| 2020/0250909 | A1 | 8/2020 | Li et al. | |
| 2021/0185138 | A1* | 6/2021 | Gant | H04L 63/0861 |
| 2022/0136790 | A1* | 5/2022 | Holland | F41A 17/46 42/70.01 |
| 2022/0340032 | A1* | 10/2022 | Chen | B60L 53/16 |

* cited by examiner

1100

DOCKING STATION FOR AN ELECTROMECHANICAL GUN

CROSS-REFERENCE TO RELATED APPLICATIONS

This application is a continuation of U.S. patent application Ser. No. 17/661,013, titled "DOCKING STATION FOR AN ELECTROMECHANICAL GUN" and filed Apr. 27, 2022, which claims benefit of priority to U.S. Provisional Application No. 63/180,613, titled "GUN DOCK" and filed on Apr. 27, 2021, which are incorporated by reference herein in their entireties.

FIELD OF TECHNOLOGY

The teachings disclosed herein generally relate to guns, and more specifically to a docking station for an electromechanical gun.

BACKGROUND

The term "gun" generally refers to a ranged weapon that uses a shooting tube (also referred to as a "barrel") to launch solid projectiles, though some instead project pressurized liquid, gas, or even charged particles. These projectiles may be free flying (e.g., as with bullets), or these projectiles may be tethered to the gun (e.g., as with spearguns, harpoon guns, and electroshock weapons such as TASER® devices). The means of projectile propulsion vary according to the design (and thus, type of gun), but are traditionally effected pneumatically by a highly compressed gas contained within the barrel. This gas is normally produced through the rapid exothermic combustion of propellants (e.g., as with firearms) or mechanical compression (e.g., as with air guns). When introduced behind the projectile, the gas pushes and accelerates the projectile down the length of the barrel, imparting sufficient launch velocity to sustain it further towards a target after exiting the muzzle.

Most guns use compressed gas that is confined by the barrel to propel the projectile up to high speed, though the term "gun" may be used more broadly in relation to devices that operate in other ways. Accordingly, the term "gun" may not only cover handguns, shotguns, rifles, single-shot firearms, semi-automatic firearms, and automatic firearms, but also electroshock weapons, light-gas guns, plasma guns, and the like.

Significant energies have been spent developing safer ways to use, transport, store, and discard guns. Gun safety is an important aspect of avoiding unintentional injury due to mishaps like accidental discharges and malfunctions. Gun safety is also becoming an increasingly important aspect of designing and manufacturing guns. While there have been many attempts to make guns safer to use, transport, and store, those attempts have had little impact.

SUMMARY

The systems and techniques described herein support a device that is capable of communicating with a gun, such as an electromechanical gun. The term "gun," as used herein, may be used to refer to a lethal force weapon, such as a pistol, a rifle, a shotgun, a semi-automatic firearm, or an automatic firearm; a less-lethal weapon, such as a stun-gun or a projectile emitting device; or an assembly of components operable to selectively discharge matter or charged particles, such as a firing mechanism.

Generally, the described systems and techniques described herein provide for a device that is capable of communicating with an electromechanical gun. The device may be an example of the docking station or a portable device that is capable of communicating with a gun, and the device may be communicatively coupled with the gun based on a physical electrical interface of the device, such as a universal serial bus (USB) connector. The USB connector may be configured to mate with a complementary USB connector of the electromechanical gun, and the device may transmit messages to the electromechanical gun and receive messages from the electromechanical gun via the physical electrical interface. In some examples, the device may perform a handshake procedure with the electromechanical gun and transmit or receives messages based on the handshake procedure. The device may receive a message from the electromechanical gun including information about the electromechanical gun, such as a configuration file indicating a configuration of one or more peripheral components (e.g., a laser sight, a flashlight, an illuminator, etc.) of the electromechanical gun, and the device may present the information about the electromechanical gun at an interface, such as a touch-sensitive display mechanism. The device may transmit a message containing a change request to the electromechanical gun, and the electromechanical gun may modify the configuration of one or more peripheral components based on the change request.

Figure 1:
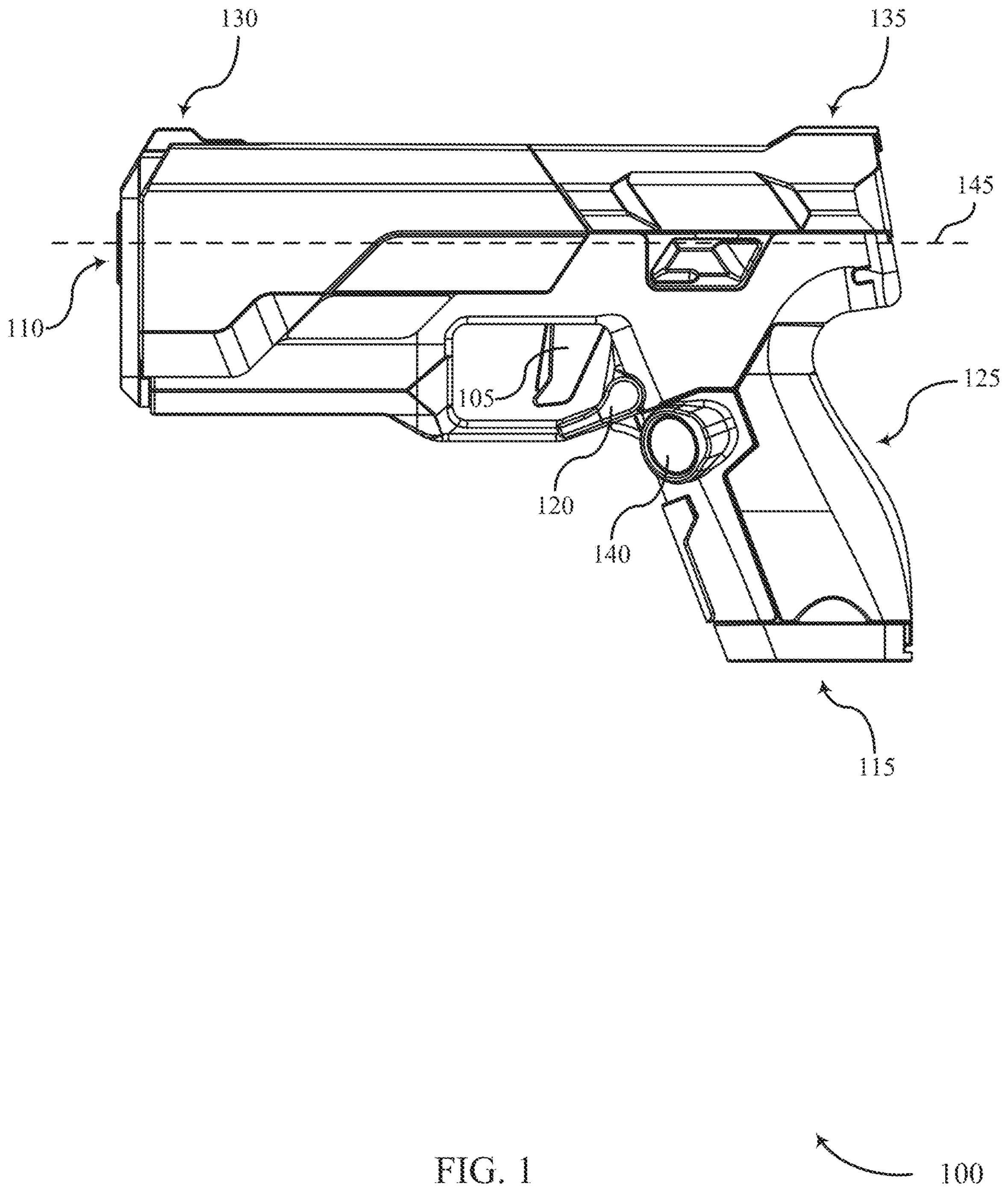
FIG. 1 illustrates an example of a gun that can be coupled with a docking station.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, the technology is amenable to modifications that may not be reflected in the drawings.

DETAILED DESCRIPTION

Some conventional guns include powered components, such as a flashlight or laser. Such components may be charged through a charging cable, by replacing the battery, or by removing, charging, and then reinstalling the battery. However, these actions can create a nuisance for the user. Having to remove or replace batteries can not only create friction for the user, but can also result in the gun having a dead battery, which can yield components of the gun, or the gun itself, non-functional.

Some aspects of a gun may be customized or configured, but implementing a user interface for configuring the gun directly on the gun can negatively impact user experience and potentially reduce the reliability of the gun. As an example, the gun may include a flashlight that supports multiple modes of function, such as a high-beam mode, a low-beam mode, and a strobe mode. The user of the gun may cycle through the modes of function by pressing the power button on the flashlight, but this may create a situation where the user cycles through the high-beam mode or the strobe-mode to get to the low-beam mode. Cycling through multiple modes of operation takes time and can leave the user at a tactical disadvantage by generating a strobe when a low-beam mode is desired. Designing the gun to include a user interface, such as a touch-sensitive display mechanism, that supports collecting user input to configure the modes of operation for components of the gun can impose a significant drain on power and add computational complexity to the gun, which may reduce the reliability or usability of the gun.

Including a user interface as an aspect of the gun for configuring the behavior of the gun can be challenging, as adding components that support configuring aspects of the gun, such as a processor, buttons, or a touch-sensitive display, may take up space and impose a significant drain on power. Additionally, while supporting software updates for the gun may be desirable, including a wireless interface in the gun can increase the attack surface of the gun, which can potentially make the gun more vulnerable to nefarious individuals. For example, a hacker may exploit a wireless communication protocol vulnerability in an attempt to gain access to the gun via the wireless interface. As such, a system capable of communicating with the gun in a secure fashion while also providing a user interface for interacting with the gun is desired.

Introduced here, therefore, is a docking station (also referred to as a "dock") that provides a physical cradle and an electrical interface for connecting to an electromechanical gun. The docking station described herein provides a user interface (or simply "interface") for providing information to, and collecting information from, a user in a familiar and reliable manner. The docking station also facilitates the ergonomic and reliable design of guns, as large, power-hungry components can be included in the docking station, and the docking station can connect to the gun via an electrical interface. The docking station can be communicatively coupled with a gun via the electrical interface, a user may provide user input to the docking to indicate a preferred configuration of the gun, and the docking station may transmit messages over the electrical interface to configure the gun according to the preferred configuration. The electrical interface may function based on the maintenance of a physical coupling between one or more electrical contacts of the gun and one or more complementary electrical contacts of the docking station, such as is the case for a universal serial bus (USB) interface. Alternatively, the electrical interface may allow for a wireless coupling to be maintained between a wireless power integrated circuit (also called a "chip") included in the gun and a complementary wireless power chip included in the docking station.

The docking station may be used to charge the gun, view data associated with the gun, or configure aspects of the gun. In other words, the docking station can charge the gun and provide an interface for interacting with the gun. Since a gun may be removably coupled with the docking station, the docking station can include a large interface that allows users to easily interact with the gun while keeping the gun sleek and compact. Including large-footprint components (e.g., a display panel, a cooling fan, a battery pack, etc.) in the dock allows the gun to include smaller and/or fewer components, thereby improving the ergonomic design of the gun and the user experience of configuring aspects of the gun.

The docking station may also provide a system for delivering software updates to the gun. For example, a user may connect a flash drive containing a software update to the dock, and the software update may be delivered to the gun via the electrical interface coupling the dock and the gun. The electrical interface may be a physical electrical interface, such as a USB interface, a Thunderbolt interface, a peripheral component interconnect (PCI) express interface, or the like. The docking station may receive a software update via the electrical interface of the device and apply the software update to the gun. For example, the docking station may receive the software update from a device that is external to the docking station and verify the authenticity of the software update by verifying a digital signature of the software update, verifying a digital certificate of the software update, performing a random challenge, or the like. In some examples, the docking station may verify the integrity of the software update by generating a checksum value for the received software and comparing the generated checksum to a predetermined checksum value. The docking station may determine that the software update is uncorrupted based on the generated checksum value matching the predetermined checksum value, and the docking station may determine that the software update is corrupted based on the generated checksum not matching the predetermined checksum.

The docking station may transmit the software update to the gun via the electrical interface based on determining that the software update is authentic and/or uncorrupted. Applying the software update may result in the modification of a user enrollment procedure, modification of a user authentication procedure, modification of a threshold for a proximity sensor, modification of a logical condition for determining whether a user is holding the gun, or the like. Applying the software update may improve existing features of the gun and/or add new features to the gun.

In some examples, the docking station may support wireless communications. For example, some versions of the docking station may include a wireless electrical interface, and some users may choose to purchase the dock with the wireless electrical interface. In such examples, the dock may receive software updates over the wireless electrical interface, and the dock may deliver the software updates to the gun via the physical electrical interface. Including a wireless electrical interface in the dock facilitates the rapid and reliable deployment of software updates to the gun through the dock while allowing the gun to be air-gapped. In other words, the gun may not include any wireless communication chips, which may reduce the attack surface of the gun. The gun may receive software updates from the docking station, and the docking station may acquire software updates from a device that is external to the docking station, such as a flash drive, a computer a server, or the like.

The dock may include a physical cradle that holds the gun in a stationary position. The cradle may hold the gun in a position that facilitates the performing of various procedures, such as a user enrollment procedure or a user authentication procedure. For example, the cradle may hold the gun in a predetermined position such that the trigger is covered but a biometric sensor is exposed. Keeping the biometric sensor exposed allows the user to enroll biometric data as part of a user enrollment procedure while protecting the trigger and reducing the likelihood of an accidentally touching the trigger. In some examples, the dock may include a tether that allows the gun to be moved while maintaining the connection between the dock and the gun. As an illustrative example of a tether, the dock may include a USB Type-C (USB-C) connector that is located at the end of a cord, and the dock may be communicatively coupled with the gun by plugging the USB-C connector into a physical electrical interface of the gun.

Embodiments may be described in the context of executable instructions for the purpose of illustration. For example, a processor housed in a dock may be described as being capable of executing instructions that dock to communicate with an electromechanical gun. However, those skilled in the art will recognize that aspects of the technology could be implemented via hardware, firmware, or software.

Terminology

References in the present disclosure to "an embodiment" or "some embodiments" means that the feature, function, structure, or characteristic being described is included in at least one embodiment. Occurrences of such phrases do not necessarily refer to the same embodiment, nor do they necessarily refer to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. For example, the phrase "A is based on B" does not imply that "A" is based solely on "B." Thus, the term "based on" is intended to mean "based at least in part on" unless otherwise noted.

The terms "connected," "coupled," and variants thereof are intended to include any connection or coupling between two or more elements, either direct or indirect. The connection or coupling can be physical, electrical, logical, or a combination thereof. For example, elements may be electrically or communicatively coupled with one another despite not sharing a physical connection. As one illustrative example, a first component is considered coupled with a second component when there is a conductive path between the first component and the second component. As another illustrative example, a first component is considered coupled with a second component when the first component and the second component are fastened, joined, attached, tethered, bonded, or otherwise linked.

The term "manager" may refer broadly to software, firmware, or hardware. Managers are typically functional components that generate one or more outputs based on one or more inputs. A computer program may include or utilize one or more managers. For example, a computer program may utilize multiple managers that are responsible for completing different tasks, or a computer program may utilize a single manager that is responsible for completing all tasks. As another example, a manager may include an electrical circuit that produces an output based on hardware components, such as transistors, logic gates, analog components, or digital components. Unless otherwise noted, the terms "manager" and "module" may be used interchangeably herein.

When used in reference to a list of multiple items, the term "or" is intended to cover all of the following interpretations: any of the items in the list, all of the items in the list, and any combination of items in the list. For example, the list "A, B, or C" indicates the list "A" or "B" or "C" or "A and B" or "A and C" or "B and C" or "A and B and C."

Overview of Guns

FIG. 1 illustrates an example of a gun 100 that can be coupled with a docking station described herein. The gun 100 includes a trigger 105, a barrel 110, a magazine 115, and a magazine release 120. While these components are generally found in firearms, such as pistols, rifles, and shotguns, those skilled in the art will recognize that the technology described herein may be similarly applicable to other types of guns as discussed above. As an example, comparable components may be included in vehicle-mounted weapons that are not intended to be held or operated by hand. While not shown in FIG. 1, the gun 100 may also include a striker (e.g., a ratcheting striker or rotating striker) or a hammer that can be actuated in response to pulling the trigger 105. Pulling the trigger 105 may result in the release of the striker or hammer, thereby causing the striker or hammer to contact a firing pin, percussion cap, or primer, so as to ignite a propellant and fire a projectile through the barrel 110. Embodiments of the gun 100 may also include a blowback system, a locked breech system, or any combination thereof. These systems are more commonly found in self-reloading firearms. The blowback system may be responsible for obtaining energy from the motion of the case of the projectile as it is pushed to the rear of the gun 100 by expanding propellant, while the locked breech system may be responsible for slowing down the opening of the breech of a self-reloading firearm when fired. Accordingly, the gun 100 may support the semi-automatic firing of projectiles, the automatic firing of projectiles, or both.

The gun 100 may include one or more safeties that are meant to reduce the likelihood of an accidental discharge or an unauthorized use. The gun 100 may include one or more mechanical safeties, such as a trigger safety or a firing pin safety. The trigger safety may be incorporated in the trigger 105 to prevent the trigger 105 from moving in response to lateral forces placed on the trigger 105 or dropping the gun. The term "lateral forces," as used herein, may refer to a force that is substantially orthogonal to a central axis 145 that extends along the barrel 110 from the front to the rear of the gun 100. The firing pin safety may block the displacement path of the firing pin until the trigger 105 is pulled. Additionally or alternatively, the gun 100 may include one or more electronic safety components, such as an electronically actuated drop safety. In some cases, the gun 100 may include both mechanical and electronic safeties to reduce the potential for an accidental discharge and enhance the overall safety of the gun 100.

The gun 100 may include one or more sensors, such as a user presence sensor 125 and a biometric sensor 140. In some cases, the gun 100 may include multiple user presence sensors 125 whose outputs can collectively be used to detect the presence of a user. For example, the gun 100 may include a time of flight (TOF) sensor, a photoelectric sensor, a capacitive sensor, an inductive sensor, a force sensor, a resistive sensor, or a mechanical switch. As another example, the gun 100 may include a proximity sensor that is configured to emit an electromagnetic field or electromagnetic radiation, like infrared, and looks for changes in the field or return signal. As another example, the gun 100 may include an inertial measurement unit (IMU) configured to identify a presence event in response to measuring movement that matches a movement signature of a user picking up the gun 100. As another example, the gun 100 may include an audio input mechanism (e.g., a transducer implemented in a microphone) that is configured to generate a signal that is representative of nearby sounds, and the presence of the user can be detected based on an analysis of the signal.

The gun 100 may also include one or more biometric sensors 140 as shown in FIG. 1. For example, the gun 100 may include a fingerprint sensor (also referred to as a "fingerprint scanner"), an image sensor, or an audio input mechanism. The fingerprint scanner may generate a digital image (or simply "image") of the fingerprint pattern of the user, and the fingerprint pattern can be examined (e.g., on the gun 100 or elsewhere) to determine whether the user should be verified. The image sensor may generate an image of an anatomical feature (e.g., the face or eye) of the user, and the image can be examined (e.g., on the gun 100 or elsewhere) to determine whether the user should be verified. Normally, the image sensor is a charge-coupled device (CCD) or complementary metal-oxide semiconductor (CMOS) sensor that is included in a camera module (or simply "camera") able to generate color images. The image sensor need not necessarily generate images in color, however. In some embodiments, the image sensor is configured to generate ultraviolet, infrared, or near infrared images. Regardless of its nature, images generated by the image sensor can be used to authenticate the presence or identity of the user. As an example, an image generated by a camera may be used to perform facial recognition of the user. The audio input mechanism may generate a signal that is representative of audio containing the voice of the user, and the signal can be examined (e.g., on the gun 100 or elsewhere) to determine whether the user should be verified. Thus, the signal generated by the audio input mechanism may be used to perform speaker recognition of the user. Including multiple biometric sensors in the gun 100 may support a robust authentication procedure that functions in the event of sensor failure, thereby improving gun reliability. Note, however, that each of the multiple biometric sensors may not provide the same degree or confidence of identity verification. As an example, the output produced by one biometric sensor (e.g., an audio input mechanism) may be used to determine whether a user is present while the output produced by another biometric sensor (e.g., a fingerprint scanner or image sensor) may be used to verify the identity of the user in response to a determination that the user is present.

The gun 100 may include one or more components that facilitate the collection and processing of token data. For example, the gun 100 may include an integrated circuit (also referred to as a "chip") that facilitates wireless communication. The chip may be capable of receiving a digital identifier, such as a Bluetooth® token or a Near Field Communication (NFC) identifier. The term "authentication data" may be used to described data that is used to authenticate a user. For example, the gun 100 may collect authentication data from the user to determine that the user is authorized to operate the gun 100, and the gun 100 may be unlocked in based on determining that the user is authorized to operate the gun 100. Authentication data may include biometric data, token data, or both. Authentication data may be referred to as enrollment data when used to enroll a user, and authentication data may be referred to as query data when used to authenticate a user. In some examples, the gun may transform (e.g., encrypt, hash, transform, encode, etc.) enrollment data and store the transformed enrollment data in memory (e.g., non-volatile memory) of the gun, and the gun may discard or refrain from storing query data in the memory. Thus, the gun 100 may transform authentication data, so as to inhibit unauthenticated use even in the event of unauthorized access of the gun.

The gun 100 may support various types of aiming sights (or simply "sights"). At a high level, a sight is an aiming device that may be used to assist in visually align the gun 100 (and, more specifically, its barrel 110) with a target. For example, the gun 100 may include iron sights that improve aim without the use of optics. Additionally or alternatively, the gun 100 may include telescopic sights, reflex sights, or laser sights. In FIG. 1, the gun 100 includes two sights-namely, a front sight 130 and a rear sight 135. In some cases, the front sight 130 or the rear sight 135 may be used to indicate gun state information. For example, the front sight 130 may include a single illuminant that is able to emit light of different colors to indicate different gun states. As another example, the front sight 130 may include multiple illuminants, each of which is able to emit light of a different color, that collectively are able to indicate different gun states. One example of an illuminant is a light-emitting diode (LED).

The gun 100 may fire projectiles, and the projectiles may be associated with lethal force or less-lethal force. For example, the gun 100 may fire projectiles containing lead, brass, copper, zinc, steel, plastic, rubber, synthetic polymers (e.g., nylon), or a combination thereof. In some examples, the gun 100 is configured to fire lethal bullets containing lead, while in other cases the gun 100 is configured to fire less-lethal bullets containing rubber. As mentioned above, the technology described herein may also be used in the context of a gun that fires prongs (also referred to as "darts") which are intended to contact or puncture the skin of a target and then carry electric current into the body of the target. These guns are commonly referred to as "electronic control weapons" or "electroshock weapons." One example of an electroshock weapon is a TASER device.

The gun 100 may be an example of an electromechanical gun that is configured to be communicatively coupled with a docking station. The gun 100 may be communicatively coupled with the docking station based on a physical electrical interface of the gun 100, such as a universal serial bus (USB) connector mating with a complementary USB connector of the docking station. The gun 100 may transmit messages to the docking station and receive messages from the docking station. In some examples, the gun 100 may perform a handshake procedure with the docking station and transmit or receives messages based on the handshake procedure. The gun 100 may transmit a message to the docking station including information about the gun 100, such as a current configuration of one or more peripheral components (e.g., a laser sight, a flashlight, an illuminator, etc.) of the gun 100 and the docking station may present the information about the gun 100 at an interface. For example, the docking station may display the information about the gun 100 at a display mechanism, such as a touch-sensitive display panel. The gun 100 may receive a message containing a change request from the docking station, and the gun 100 may modify the configuration of one or more peripheral components based on the change request. As an illustrative example, the change request may indicate a preferred default power status (e.g., powered on, powered off, etc.) for a peripheral component for a user, and the gun 100 may ensure that the peripheral component assumes the preferred power status for the user. In other words, the user may use the dock to configure the gun 100 such that the gun 100 powers on an LED embedded in the front sight 130 when the user is operating the gun.

Figure 2:
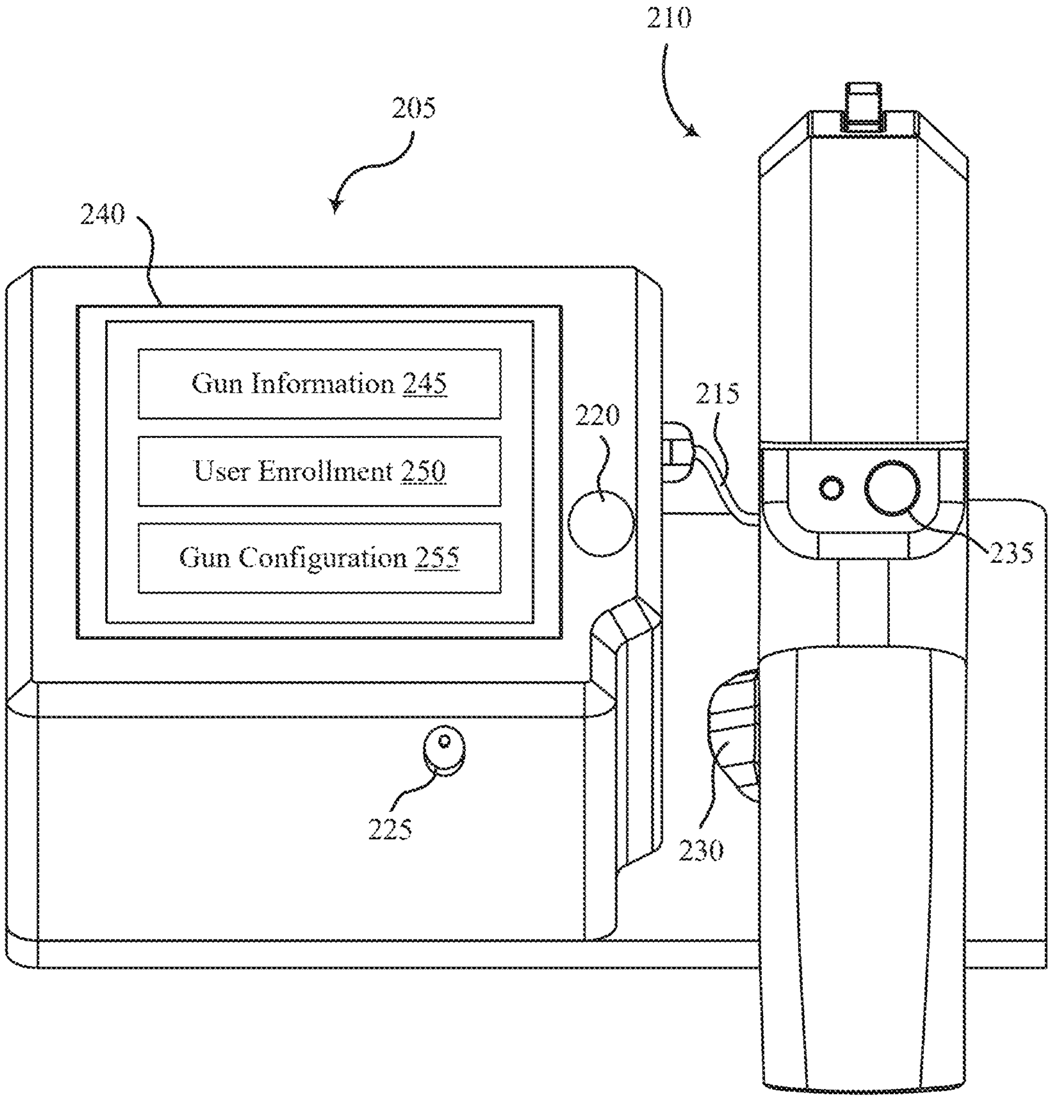
FIG. 2 illustrates an example of a docking station that is coupled with a gun.

FIG. 2 illustrates an example of a dock 205 that is communicatively coupled with an electromechanical gun 210. The electromechanical gun 210 may include both mechanical and electrical components. For example, the electromechanical gun 210 may include a mechanical magazine for managing cartridges and electrical processor for analyzing biometric data.

The dock 205 is communicatively coupled with the electromechanical gun 210 via the electrical interface 215. The electrical interface 215 is an example of a physical electrical interface, and the electrical interface 215 may include a power channel, a data channel, or both. As an illustrative example, the electrical interface 215 may include a USB-C connector, and the electrical interface 215 may implement a communication protocol (e.g., USB 2.0, USB 3.1, etc.) for a data channel and a power delivery protocol (e.g., USB Power Delivery 2.0, USB Power Delivery 3.1, etc.) for a power channel.

The dock 205 may use the electrical interface 215 to communicate with the electromechanical gun 210. The dock 205 and the electromechanical gun 210 may communicate by exchanging messages (e.g., data packets). A handshake procedure may be performed to verify the authenticity of the electromechanical gun 210, to verify the authenticity of the dock 205, or to determine a cryptographic secret that is shared between the dock 205 and the electromechanical gun 210. The dock 205 may verify the authenticity of the electromechanical gun 210, and the electromechanical gun 210 may verify the authenticity of the dock 205. The authenticity of the dock 205 and/or the electromechanical gun 210 may be verified based on a digital signature, a random challenge, a digital certificate, or the like. The cryptographic secret may be determined based on a Rivest-Shamir-Adleman (RSA) key exchange, a Diffie-Hellman (DH) key exchange, an Extended Triple Diffie-Hellman (X3DH) key exchange, or the like. An authentic dock or electromechanical gun may correspond to a dock or electromechanical gun produced by a trusted manufacturer or company. The cryptographic secret may be used to derive an ephemeral cryptographic key, and the ephemeral cryptographic key may be used for encrypting and decrypting messages that are transmitted over the electrical interface 215.

The ephemeral cryptographic key may be discarded following a communication session (also referred to as a "session"). A session may include one or more messages that are associated with a cryptographic secret or a handshake procedure. The ephemeral cryptographic key may be updated (also referred to as "ratcheted") during a session. A cryptographic key, such as an ephemeral cryptographic key, may be ratcheted based on key derivation function (KDF), a DH key exchange, or the like. As an example, an ephemeral cryptographic key may be used to encrypt a message, the ephemeral cryptographic key may be ratcheted to produce a new ephemeral cryptographic key, the new ephemeral cryptographic key may be used to encrypt a new message, the new ephemeral cryptographic key may be ratcheted, and so on. The dock 205 includes an electrical interface 215, but it should be understood that the dock 205 may include a physical electrical interface, a wireless electrical interface, or both. For example, the dock 205 may include a physical electrical interface capable of communicatively coupling the dock 205 with the electromechanical gun 210 and/or receiving software updates from an external device, a wireless electrical interface capable of communicatively coupling the dock 205 with the electromechanical gun 210 and/or receiving software updates from an external device, or an combination thereof. A wireless electrical interface may implement a standard for wirelessly transferring power to the electromechanical gun 210, such as the Qi standard.

The dock 205 may support a user authentication procedure, and the handshake procedure may be performed in response to the user authentication procedure producing an output indicating that a user is authorized to operate or interact with the electromechanical gun 210. In some examples, the user authentication procedure may be performed in response to an output generated during the handshake procedure indicating that the dock 205 is authentic, in response to an output generated during the handshake procedure indicating that the electromechanical gun 210 is authentic, or in response to both. Authentication data may be collected as part of the user authentication procedure, and it may be determined that the user is authorized to operate the electromechanical gun 210 based on the authentication data. Authentication data may include biometric data (e.g., fingerprint data, vein pattern data, facial profile data, etc.), token data (e.g., an NFC identifier, a Bluetooth token, a digital signature, etc.), or both.

In some examples, the dock 205 may collect the authentication data, while in some other examples, the electromechanical gun 210 may collect the authentication data. As an example, the dock 205 may include a fingerprint scanner 220 and/or a camera 225. The user may provide biometric data (e.g., query data) via the fingerprint scanner 220 and/or the camera 225, and the dock 205 may determine that the user is authorized to operate the electromechanical gun 210 based on the biometric data matching additional biometric data (e.g., enrollment data) stored in memory of the dock 205. The dock 205 may generate an output indicating that the user is authorized to operate the electromechanical gun 210, and the user may configure the electromechanical gun 210 via the interface 240 based on the output indicating that the user is authorized to operate the electromechanical gun 210.

As another example, the electromechanical gun 210 may include a fingerprint scanner 230 and/or a camera 235. The user may provide biometric data (e.g., query data) via the fingerprint scanner 230 and/or the camera 235, and the electromechanical gun 210 may determine that the user is authorized to operate the electromechanical gun 210 based on the biometric data matching additional biometric data (e.g., enrollment data) stored in memory of the electromechanical gun 210. The electromechanical gun 210 may generate an output indicating that the user is authorized to operate the electromechanical gun 210, and the electromechanical gun 210 may transmit a message containing the output to the dock 205 to indicate that the user is authorized to operate the electromechanical gun 210. The user may configure the electromechanical gun 210 via the interface 240 based on the message containing the output indicating that the user is authorized to operate the electromechanical gun 210. Aspects of the interface 240 may be generated in response to the output indicating that the user is authorized to operate the electromechanical gun 210. For example, the interface 240 may display an icon, a widget, dialog box, a dropdown menu, or the like in response to the output indicating that the user is authorized to operate the electromechanical gun 210.

The dock 205 may receive data, generate data, or display information at the interface 240 based on the output indicating that the user is authorized to operate the electromechanical gun 210. For example, in response to generating the output or receiving a message containing the output, the dock 205 may display gun information 245, information associated with user enrollment 250, or information associated with a gun configuration 255. As another example, the dock 205 may receive data and/or display information at the interface 240 in response to receiving the message containing the output indicating that the user is authorized to operate the electromechanical gun 210. The information displayed at the interface 240 may include gun information 245, information associated with user enrollment 250, or information associated with a gun configuration 255.

The gun information 245 may include information related to the electromechanical gun 210, such as the manufacturer of the electromechanical gun 210, the model of the electromechanical gun 210, or the status (e.g., a ready status, a locked status, a warning status, an error status, etc.) of the electromechanical gun 210. In some examples, the electromechanical gun 210 may transmit one or more messages containing information about the electromechanical gun 210 to the dock 205, the dock 205 may parse the one or more messages, and the dock 205 may display the gun information 245. As an example, the electromechanical gun 210 may transmit a message containing an error code to the dock 205 and the dock 205 may display information indicating that the electromechanical gun 210 is in an error state. The dock 205 may display an instruction indicating how to resolve or troubleshoot the error. As another example, the electromechanical gun 210 may transmit a message containing an indication of a shot count for a component of the electromechanical gun 210 and the dock 205 may display information indicating the shot count for the component. The dock 205 may display an image and/or a serial number for the component, a product number for a replacement component that is compatible with the electromechanical gun 210, a uniform resource locator (URL) for a replacement component, or quick response (QR) code for a replacement component.

The dock 205 may display information associated with user enrollment 250 and/or or information associated with gun configuration 255 at the interface 240. The information associated with user enrollment 250 may support a user enrollment procedure. For example, the information associated with user enrollment 250 may include a text prompt instructing the user to provide biometric data to the fingerprint scanner 220, the fingerprint scanner 230, the camera 225, or the camera 235. The user may be authorized to operate the electromechanical gun 210 based on completing the user enrollment procedure. The information associated with the gun configuration 255 may support performing a gun configuration procedure. For example, the information associated with the gun configuration 255 may include a configuration of the electromechanical gun 210 and interface components for modifying the configuration of the electromechanical gun 210, such as a widget, a button, a drop-down menu, a toggle, a color selector, or the like. The user may provide input to the dock 205 by selecting an interface component, the dock 205 may generate a message configured to modify the configuration of the electromechanical gun 210, and the dock 205 may transmit the message to the electromechanical gun 210. In response to the message, the electromechanical gun 210 may modify a configuration of a peripheral component of the electromechanical gun 210 and transmit a message to the dock 205 indicating the modified configuration. The interface 240 may be updated to reflect the modified conjugation of the electromechanical gun 210. For example, the user may toggle the default power state for a laser sight of the electromechanical gun 210, and the interface 240 may reflect the updated default power state for the laser sight.

Figure 3:
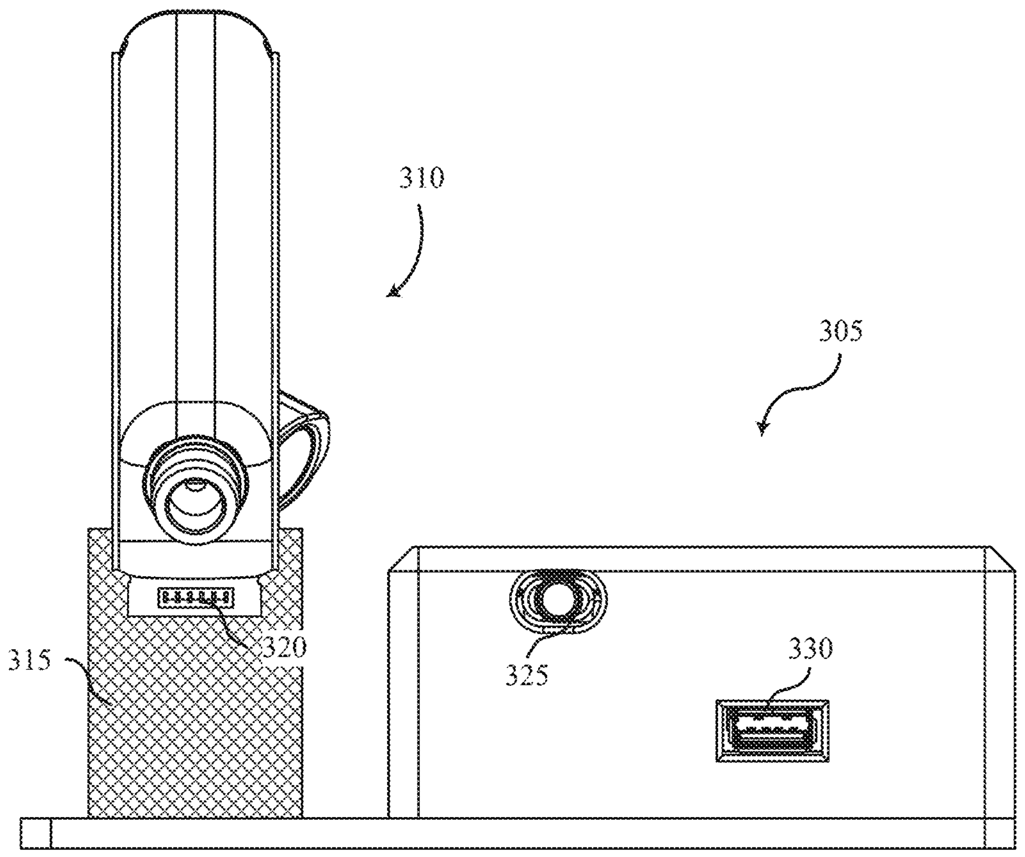
FIG. 3 illustrates an example of docking station that is cradling a gun.

FIG. 3 illustrates an example of a dock 305 that is cradling a gun 310. The gun 310 may be an example of an electromechanical gun. The dock 305 includes a physical cradle 315 that is designed to hold the gun 310 in a predetermined position. In some examples the predetermined position may be stationary, while in some other examples, the predetermined position may be dynamic such that the gun 310 can pivot while being held by the physical cradle 315.

A member of the dock 305, such as a portion of the physical cradle 315, may cover the trigger of the gun 310 so as to reduce access to the trigger while the gun 310 is loaded into, held by, or otherwise coupled with, the physical cradle 315. The physical cradle 315 may include a locking mechanism that is configured to couple the gun 310 with the dock 305. A locking mechanism may include a magnet and/or a mechanical component, such as a latch, a dovetail joint, a displaceable rod, or the like, and the gun 310 may include a complementary component that supports locking the gun 310 to the dock 305, such as a latch, magnetic, an aperture, a dovetail join, or the like. In some examples, the locking mechanism may be an example of a biometric locking mechanism that is configured to release the gun 310 in response to a user authentication procedure. For example, a user my provide biometric data to the dock 305 or the gun 310, and the dock 305 generate or receive an output indicating that the user is authorized to unlock the gun 310. The output may be generated or received based on a user authentication procedure indicating that the provided biometric data (e.g., query data) matches stored biometric data (e.g., enrollment data). The dock 305 may receive the output via the electrical interface 330 when the gun 310 performs the authentication procedure, and the dock 305 may generate the output when the dock 305 performs the authentication procedure. The locking mechanism may release the gun 310 based on the output indicating that the user is authorized to operate the gun 310.

The gun 310 may include an electrical interface 320 and the dock 305 may include an electrical interface 330. The dock 305 may be communicatively coupled with the gun 310 based on a conductive path existing between the electrical interface 330 and the electrical interface 320. For example, the dock 305 and the gun 310 may be communicatively coupled based on a physical electrical interface that includes the electrical interface 320, the electrical interface 330, and a physical transmission medium, such as a cord, a cable, or a wire creating a conductive path between the electrical interface 320 and the electrical interface 330. Examples of electrical interfaces include a USB interface, a USB-C interface, a Thunderbolt interface, a high-definition multimedia interface (HDMI), a DisplayPort interface, and a mini-DisplayPort interface.

The dock 305 includes a power source 325, which may be used to charge a battery pack of the dock 305 and/or a battery pack of the gun 310. For example, the dock 305 may include a charging circuit that facilitates the charging of the battery pack of the dock 305, the powering of the interface of the dock 305, the charging of a battery pack of the gun 310, the powering of a processor of the gun 310, or any combination thereof.

Figure 4:
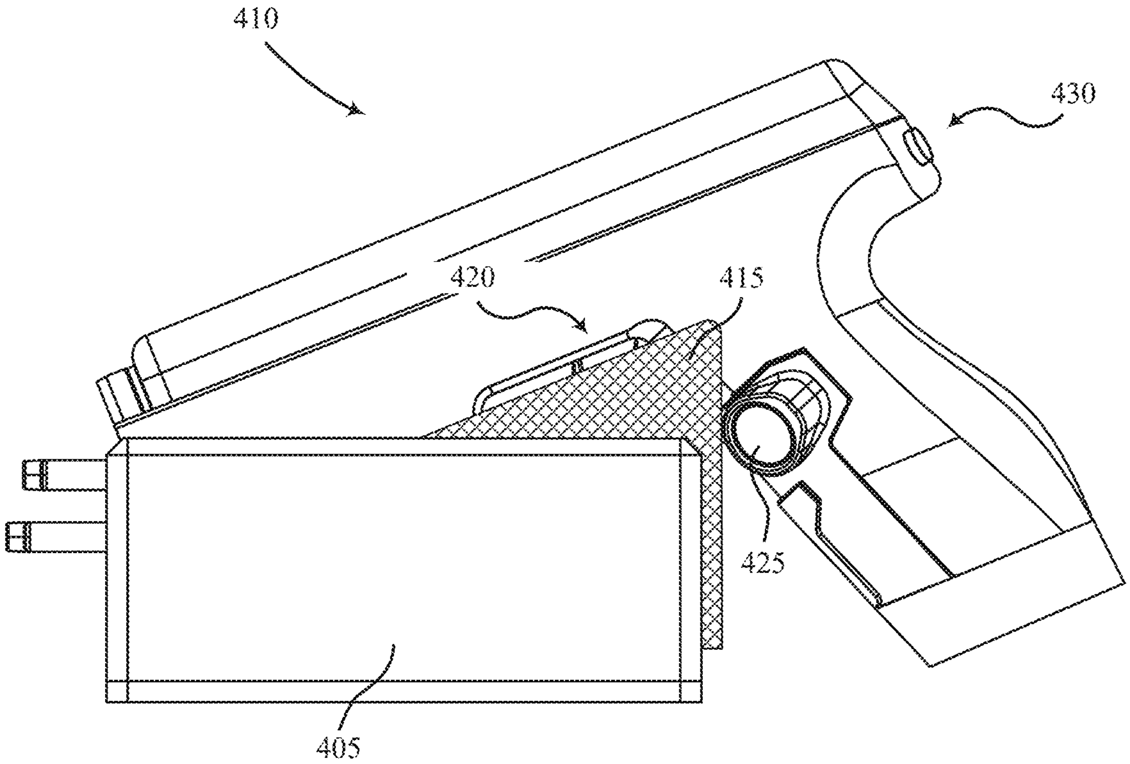
FIG. 4 illustrates an example of docking station that is cradling a gun.

FIG. 4 illustrates an example of a dock 405 that is cradling a gun 410. The dock 405 includes a member 415 that is configured to limit or restrict access to the trigger 420 while the gun 410 is coupled with the dock 405. For example, the gun 410 may be loaded into a physical cradle including the member 415, and the member 415 may limit access to the trigger 420 so as to reduce the possibility of a user accidently pulling the trigger 420 while the gun 410 is being cradled by the dock 405.

The dock 405 may hold the gun 410 in a predetermined position that facilitates the functioning of one or more biometric sensors of the gun 410, which may be used during a user authentication procedure or a user enrollment procedure. For example, the dock 405 may be configured to hold the gun 410 such that a fingerprint scanner 425 and/or a camera 430 can collect biometric data from a user. As an example, the scanning surface of the fingerprint scanner 425 may be exposed while the gun 410 is loaded in the cradle. As another example, the camera 430 may be oriented such that the camera 430 can collect facial profile data from a user while the gun 410 is loaded in the cradle. The member 415 may be an aspect of a physical cradle of the dock 405.

Figure 5:
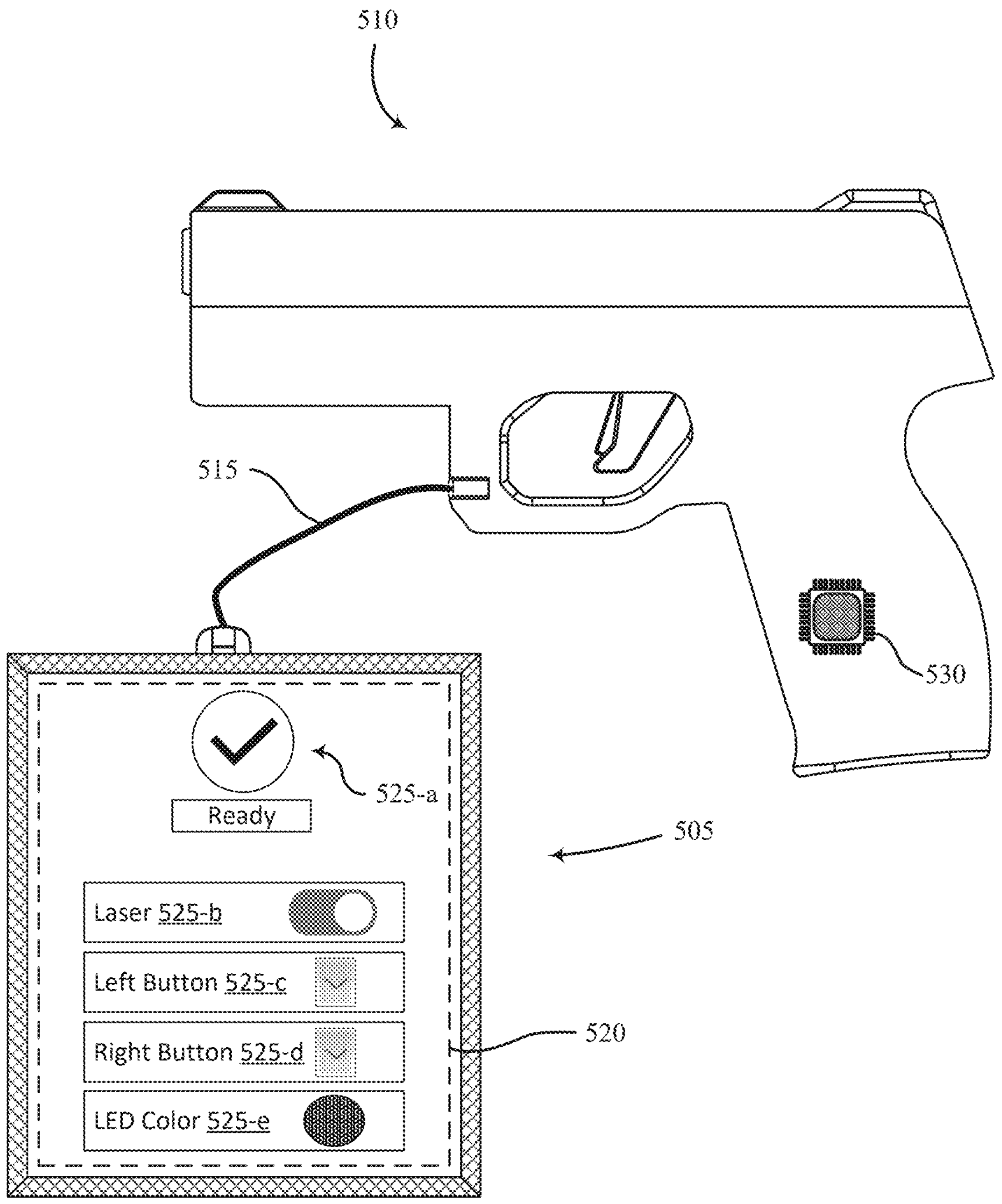
FIG. 5 illustrates an example of a docking station that is communicatively coupled with a gun.

FIG. 5 illustrates an example of a dock 505 that that is communicatively coupled with a gun 510. FIG. 5 illustrates a physical electrical interface 515 coupling the dock 505 and the gun 510, but it should be understood that a wireless electrical interface may additionally or alternatively be used to couple the dock 505 with the gun 510. For example, a user may opt-into purchasing a dock that includes a wireless electrical interface and a gun that include a wireless interface 530, and the dock may communicate with the gun over a wireless transmission medium, such as a radio-frequency spectrum region.

The physical electrical interface 515 may provide a power channel for delivering power to the gun 510 and/or a data channel for exchanging data with the gun 510. The physical electrical interface 515 may be an example of a tether that allows the gun 510 to move while being communicatively coupled with the dock 505. For example, the end of the physical electrical interface 515 may include a male USB-C connector that is configured to mate with a female USB-C connector of the gun 510.

The dock 505 may include an interface that supports interacting with a user. The interface may include a speaker, a microphone, a display mechanism, or the like. The interface may display a user-interface 520 that includes one or more interface components (also referred to as “widgets”), such as a status icon 525-*a*, a laser setting 525-*b*, a left button setting 525-*c*, a right button setting 525-*d*, or an LED color setting 525-*c*. An interface component may provide information to the user and/or allow the user to provide information to the dock 505. For example, the user may select a toggle widget to toggle the default power status of a laser of the gun 510, the user may select an item from a dropdown menu to configure the function that is to be performed by the gun 510 when a button on the left side of the gun 510 is pressed, the user may select an item from a dropdown menu to configure the function that is to be performed by the gun 510 when a button on the right side of the gun 510 is pressed, or the user select a color for an LED of the gun 510 to emit. The color for the LED may be selected by the user to configure the color that a front sight, a rear display, or a light pipe is to illuminate with in response to an event, such as a user holding the gun 510, the gun 510 completing a user authentication procedure, the gun 510 entering a low-power state, or the gun 510 entering a charging state.

Figure 6:
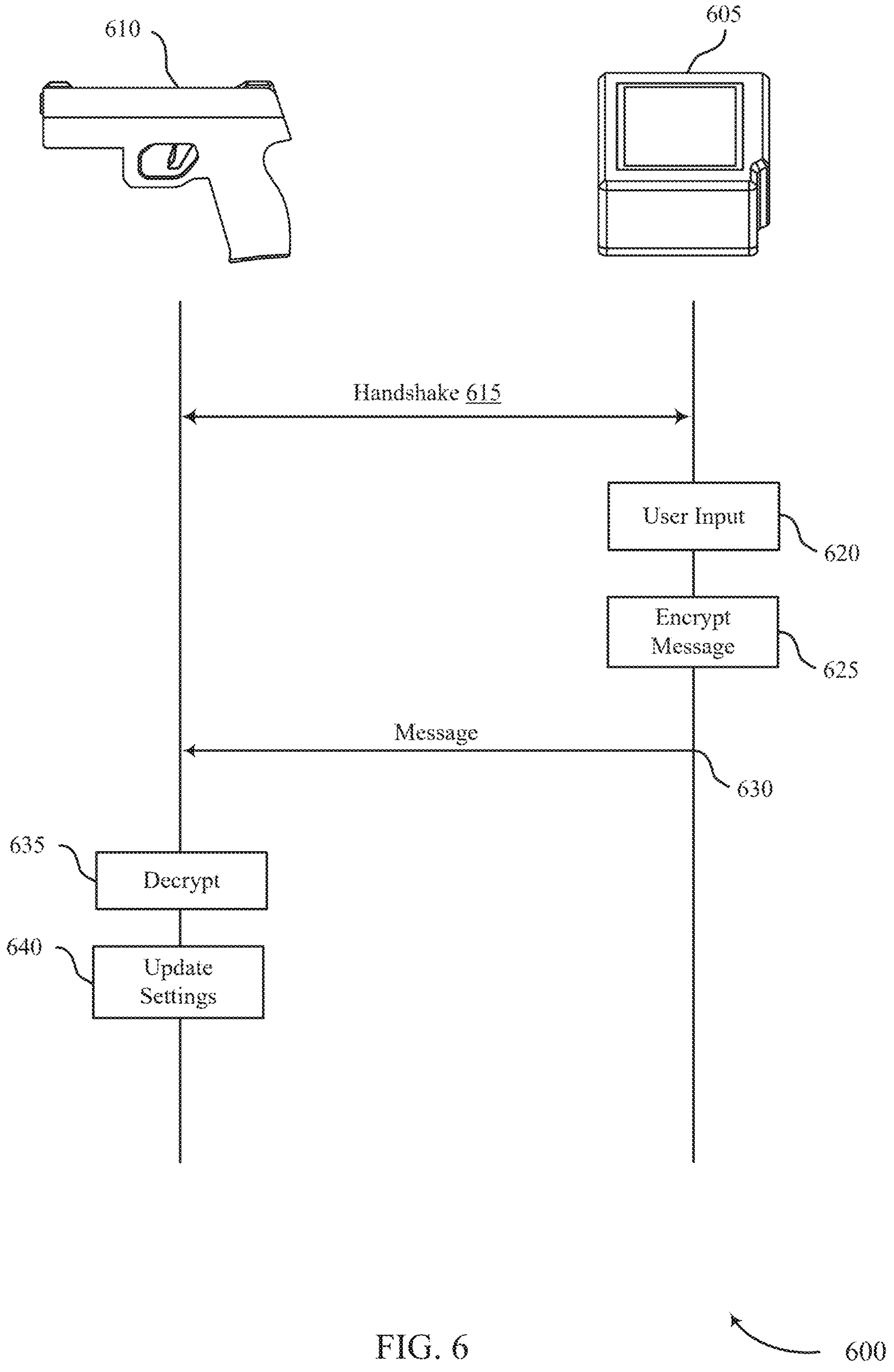
FIG. 6 illustrates an example of a process flow of communication between a gun and a docking station.

FIG. 6 illustrates a process flow 600 of communication between a device 605 and a gun 610 in accordance with aspects of the present disclosure. The device 605 may be an example of a dock, a portable configuration device, a holster, or any other device capable of communicating with the gun 610. The gun 610 is an example of a gun described herein, such as an electromechanical gun. Alternative examples of the following may be implemented, where some steps are performed in a different order than described or are not performed at all. In some cases, steps may include additional features not mentioned below, or further steps may be added.

At step 615, the device 605 and the gun 610 may perform a handshake procedure. The device 605 may verify the authenticity of the gun 610 and the gun 610 may verify the authenticity of the device 605. As part of the handshake procedure, the device 605 and the gun 610 may agree on a shared secret and generate an ephemeral cryptographic key based on the shared secret.

At step 620, the device 605 may receive user input. In some examples, the device 605 may receive the user input based on the handshake procedure, based on a user authentication procedure, or both. For example, in response to the handshake procedure, a user may provide biometric data to a biometric sensor of the gun 610, the gun 610 may perform a user authentication procedure to authorize the user to operate the gun 610, and the gun 610 may transmit a message containing an indication that the user is authorized to operate the gun 610 to the device 605. In some cases, the message containing the indication that the user is authorized to operate the gun 610 may be encrypted using an ephemeral cryptographic key generated during the handshake procedure.

In response to receiving the message containing the indication that the user is authorized to operate the gun 610, the device 605 may display a widget at an interface of the device 605. For example, the device 605 may include a touch sensitive display mechanism, and the device 605 may display a drop-down menu or a toggle button at the touch sensitive display mechanism. The user input may include a selection a widget displayed on the touch sensitive display mechanism, an activation of a tactile button of the device 605, a verbal instruction received by a microphone of the device 605, or the like. The user input may indicate a configuration change for the gun 610. For example, the device 605 may display a first toggle widget indicating that the gun 610 is configured to turn on a laser by default and a second toggle widget indicating that the gun 610 is configured to power on a flashlight by default, and the user input may deactivate the second toggle widget to indicate that the flashlight is to remain powered off by default.

The device 605 may generate a message based on the user input. For example, the device 605 may generate a message that contains a change request or an updated gun configuration. Transmitting the message containing the change request may result in the gun 610 changing the gun configuration such that, for example, the flashlight is powered off by default. Transmitting the message containing the updated gun configuration may result in the gun 610 adopting the updated gun configuration. The updated gun configuration may indicate that the flashlight is to remain powered off by default, and the gun 610 may keep the flashlight in a powered off condition based on the updated gun condition.

At step 625, the device 605 may encrypt the message to produce an encrypted version of the message. The message may be encrypted using a cryptographic key, such as an ephemeral cryptographic key, an ephemeral symmetric cryptographic key, a ratcheted ephemeral cryptographic key, etc. The cryptographic key may be generated during the handshake procedure, or the cryptographic key may be derived from data generated during the handshake procedure.

At step 630, the device 605 may transmit the encrypted version of the message to the gun 610. The encrypted version of the message may be transmitted to the gun 610 via a physical transmission medium, such as a wire or a bus, or via a wireless transmission medium, such as a radio frequency spectrum region, a licensed frequency band, an unlicensed frequency band, or the like.

At step 635, the gun 610 may decrypt the message encrypted version of the message to produce an unencrypted version of the message. The gun 610 may decrypt the message using an encryption key generated during a handshake procedure or derived from data generated during the handshake procedure. For example, the gun 610 may decrypt the encrypted version of the message using an ephemeral cryptographic key.

At step 640, the gun 610 may update settings of the gun 610 (e.g., a configuration file, a configuration of a peripheral component, etc.) based on the message. For example, the gun 610 may perform one or more functions based on a configuration file stored in memory of the gun 610, and the gun 610 may modify the configuration file based on information contained in the message. As an example, the message may contain a change request to modify the default behavior of a flashlight of the gun 610 such that the flashlight remains powered off by default upon completion of a user authentication procedure, and the gun 610 may modify the configuration file to define the default state of the flashlight to be a powered off state. As such, the flashlight of the gun 610 may remain powered off when a user picks up the gun 610.

In some examples, the device 605 may discard data associated with the gun 610. The device 605 may discard data associated with the handshake procedure, discard data related to a session, or discard data received form the gun 610. The device 605 may discard data by writing over memory, performing a reboot procedure, or both. For example, the device 605 may generate random (or pseudo-random) data based on a random number generator and write the random data to memory to erase the data associated with the gun 610. As another example, the device 605 may perform a reboot procedure to flush volatile memory and erase data associated with the gun 610.

Figure 7:
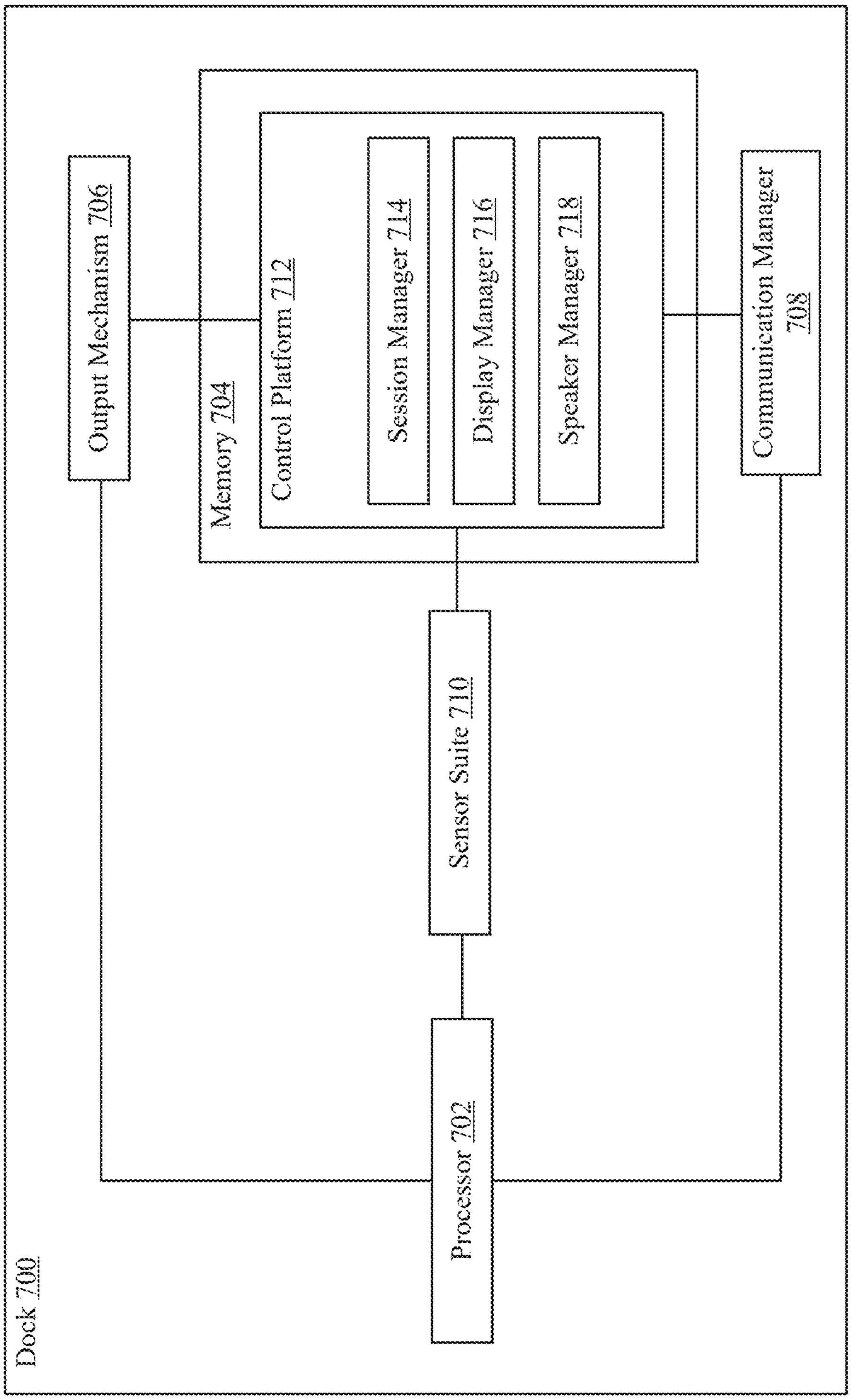
FIG. 7 illustrates an example of a docking station that supports communicating with a gun in accordance with aspects of the present disclosure.

FIG. 7 illustrates an example of a dock 700 able to implement a control platform 712 designed to produce outputs that can be used to communicate with an electromechanical gun and/or display information at an interface. As further discussed below, the control platform 712 (also referred to as a "management platform" or a "device manager") may be designed to perform a handshake procedure, perform a user authentication procedure, perform a user enrollment procedure, communicate with an electromechanics gun, or cause an electromechanical gun to modify a gun configuration (e.g., a configuration file, a default behavior of a peripheral component, etc.).

In some embodiments, the control platform 712 is embodied as a computer program that is executed by the dock 700. In other embodiments, the control platform 712 is embodied as an electrical circuit that performs logical operations of the dock 700. In yet other embodiments, the control platform 712 is embodied as a computer program that is executed by a computing device to which the dock 700 is communicatively connected. In such embodiments, the dock 700 may transmit relevant information to the computing device for processing as further discussed below. Those skilled in the art will recognize that aspects of the computer program could also be distributed amongst the dock 700 and computing device.

The dock 700 can include a processor 702, memory 704, output mechanism 706, and communication manager 708. The processor 702 can have generic characteristics similar to general-purpose processors, or the processor 702 may be an application-specific integrated circuit (ASIC) that provides control functions to the dock 700. As shown in FIG. 7, the processor 702 can be coupled with all components of the dock 700, either directly or indirectly, for communication purposes.

The memory 704 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the processor 702, the memory 704 can also store data generated by the processor 702 (e.g., when executing the managers of the control platform 712). Note that the memory 704 is merely an abstract representation of a storage environment. The memory 704 could be comprised of actual memory chips or managers.

The output mechanism 706 can be any component that is capable of conveying information to a user of the dock 700. For example, the output mechanism 706 may be a display panel (or simply "display") that includes LEDs, organic LEDs, liquid crystal elements, or electrophoretic elements. Alternatively, the display may simply be a series of illuminants (e.g., LEDs) that are able to indicate the status of the dock 700 or the status of a device that is communicatively coupled with the dock 700, such as an electromechanical gun. Thus, the display may indicate the charge status of the device. In some examples, the display may be an example of a touch sensitive display mechanism that includes an array of capacitive touch sensors. As another example, the output mechanism 706 may be a loudspeaker (or simply "speaker") that is able to audibly convey information to the user.

The communication manager 708 may be responsible for managing communications between the components of the dock 700. Additionally or alternatively, the communication manager 708 may be responsible for managing communications with computing devices that are external to the dock 700. Examples of computing devices include electromechanical guns, mobile phones, tablet computers, wearable electronic devices (e.g., fitness trackers), and network-accessible server systems comprised of computer servers. Accordingly, the communication manager 708 may be wireless communication circuitry that is able to establish communication channels with computing devices. Examples of wireless communication circuitry include integrated circuits (also referred to as "chips") configured for Bluetooth, Wi-Fi®, NFC, and the like. The communication manager 708 may additionally or alternatively include integrated circuits configured for transmitting and receiving messages across a bus, a wire, or another physical transmission medium.

Sensors are normally implemented in the dock 700. Collectively, these sensors may be referred to as the "sensor suite" 710 of the dock 700. For example, the dock 700 may include a proximity sensor whose output is indicative of proximity of the dock 700 to a an obstruction within the field of view of the proximity sensor. A proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. As another example, the dock 700 may include an ambient light sensor whose output is used to adjust the brightness of the output mechanism 706. As yet another example, the dock 700 may include a fingerprint sensor or camera that generates images which can be used for collecting biometric data for use in a user authentication and/or user enrollment procedure. As shown in FIG. 7, outputs produced by the sensor suite 710 may be provided to the control platform 712 for examination or analysis.

For convenience, the control platform 712 may be referred to as a computer program that resides in the memory 704. However, the control platform 712 could be comprised of software, firmware, or hardware components that are implemented in, or accessible to, the dock 700. In accordance with embodiments described herein, the control platform 712 may include a session manager 714, a display manager 716, and a speaker manager 718. As an illustrative example, the session manager 714 may generate, ratchet, and discard cryptographic keys, the display manager 716 may process data generated by, and transmit data to, a display mechanism, and the speaker manager 718 may process data generated by, and transmit data to, a speaker. Because the data obtained by these managers may have different formats, structures, and content, the instructions executed by these managers can (and often will) be different. For example, the instructions executed by the session manager 714 to manager cryptographic keys may be different than the instructions generated by the display manager 716 to process data generated by a display mechanism. As a specific example, the session manager 714 may implement key derivation functions that are not necessary for processing data generated by a display mechanism.

Figure 8:
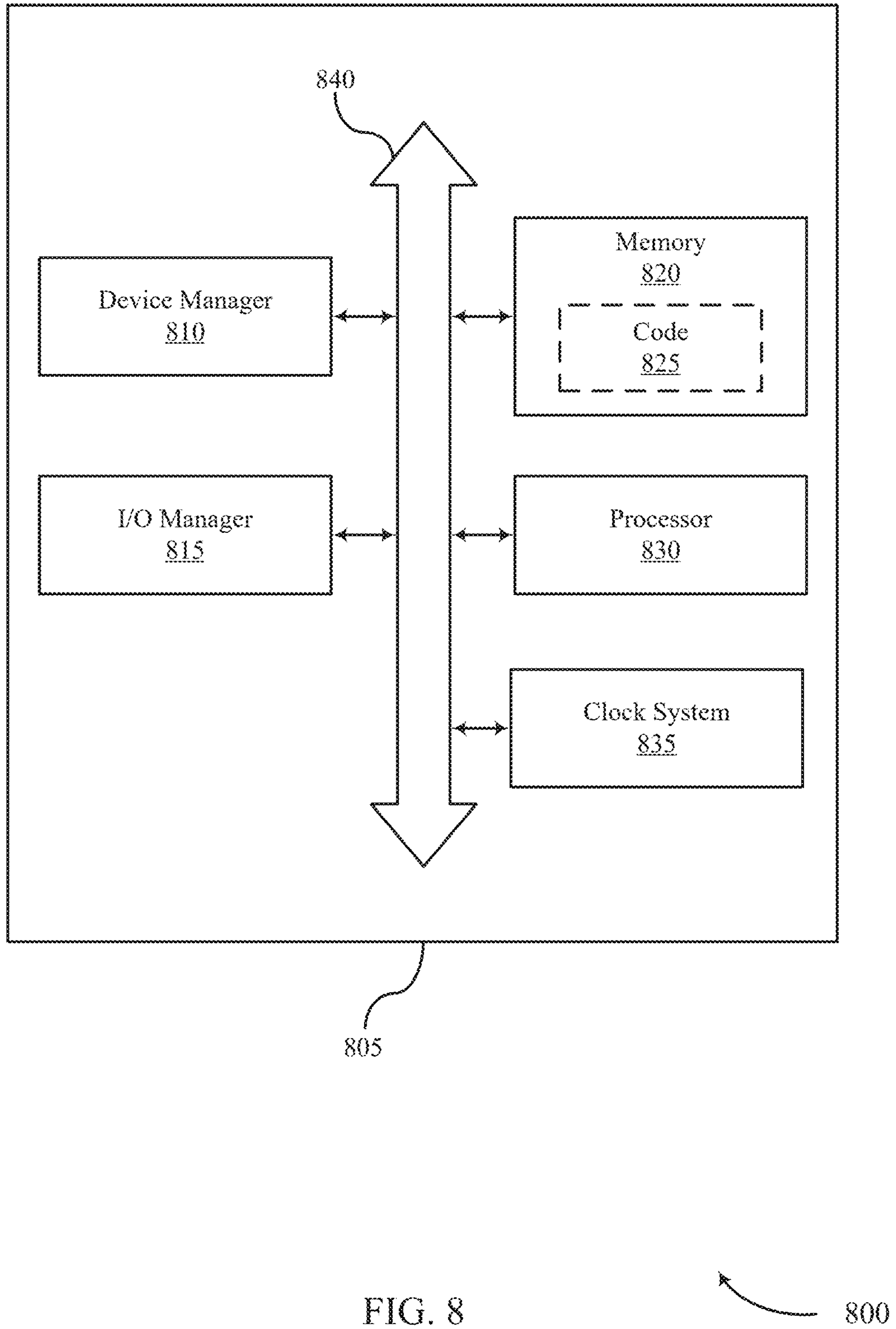
FIG. 8 illustrates an example of a system that supports communicating with a gun in accordance with aspects of the present disclosure.

FIG. 8 illustrates an example of a system 800 that supports communicating with an electromechanical gun in accordance with aspects of the present disclosure. The device 805 may be operable to implement the techniques, technology, or systems disclosed herein. The device 805 may include components such as a device manager 810, an input/output (I/O) manager 815, memory 820, code 825, a processor 830, a clock system 835, and a bus 840. The I/O manager 815 may provide a data channel and a power channel for between the device 805 and an external device, such as an electromechanical gun. The data channel and the power channel may both be wireless channels, the data channel and the power channel may both be wired channels, or a combination thereof. The components of the device 805 may communicate via one or more buses 840. The device 805 may be an example of, or include components of, a dock, an electronic gun holster, a smartphone, a tablet, or a portable device capable of communicating with an electromechanical gun.

The device manager 810 may process input collected by a touch sensitive display of the device 805. For example, the device manager 810 may generate a message containing a change request based on the input collected by the touch sensitive display. The device manager 810 may process incoming messages received from an electromechanical gun via the I/O manager, and the device manager 810 may transmit outgoing messages to the electromechanical gun via the I/O manager 815.

The device manager 810 perform a handshake procedure with an electromechanical gun, generate an ephemeral cryptographic key based on the handshake procedure, receive an encrypted message in response to the handshake procedure, decrypt the encrypted message using the ephemeral cryptographic key to produce information associated with the electromechanical gun, and cause the presentation of the information associated with the electromechanical gun at a display mechanism. For example, the device manager 810 may transmit a message containing information about the electromechanical gun to the I/O manager 815 via the bus 840, and the I/O manager 815 may generate a dialog box widget containing the information about the electromechanical gun at a display mechanism.

The I/O manager 815 may manage input and output signals for the device 805. The I/O manager 815 may also manage various peripherals such an input device (e.g., a button, a switch, a touch screen, a dock, a biometric sensor, a pressure sensor, a heat sensor, a proximity sensor, an RFID sensor, etc.), an output device (e.g., a monitor, a display, an LED, a speaker, a haptic motor, a heat pipe, etc.), and an electrical interface, such a physical electrical interface, for communicating with an electromechanical gun.

The memory 820 may include or store code (e.g., software) 825. The memory 820 may include volatile memory, such as random-access memory (RAM) and/or non-volatile memory, such as read-only memory (ROM). The code 825 may be computer-readable and computer-executable, and when executed, the code 825 may cause the processor 830 to perform various operations or functions described here.

The processor 830 may be an example or component of a central processing unit (CPU), an application specific integrated circuit (ASIC), or a field programmable gate array (FPGA). In some embodiments, the processor 830 may utilize an operating system or software such as Microsoft Windows®, iOS®, Android®, Linux®, Unix®, or the like. The clock system 835 control a timer for use by the disclosed embodiments.

The device manager 810, or its sub-components, may be implemented in hardware, software (e.g., software or firmware) executed by a processor, or a combination thereof. The device manager 810, or its sub-components, may be physically located in various positions. For example, in some cases, the device manager 810, or its sub-components may be distributed such that portions of functions are implemented at different physical locations by one or more physical components.

Figure 9:
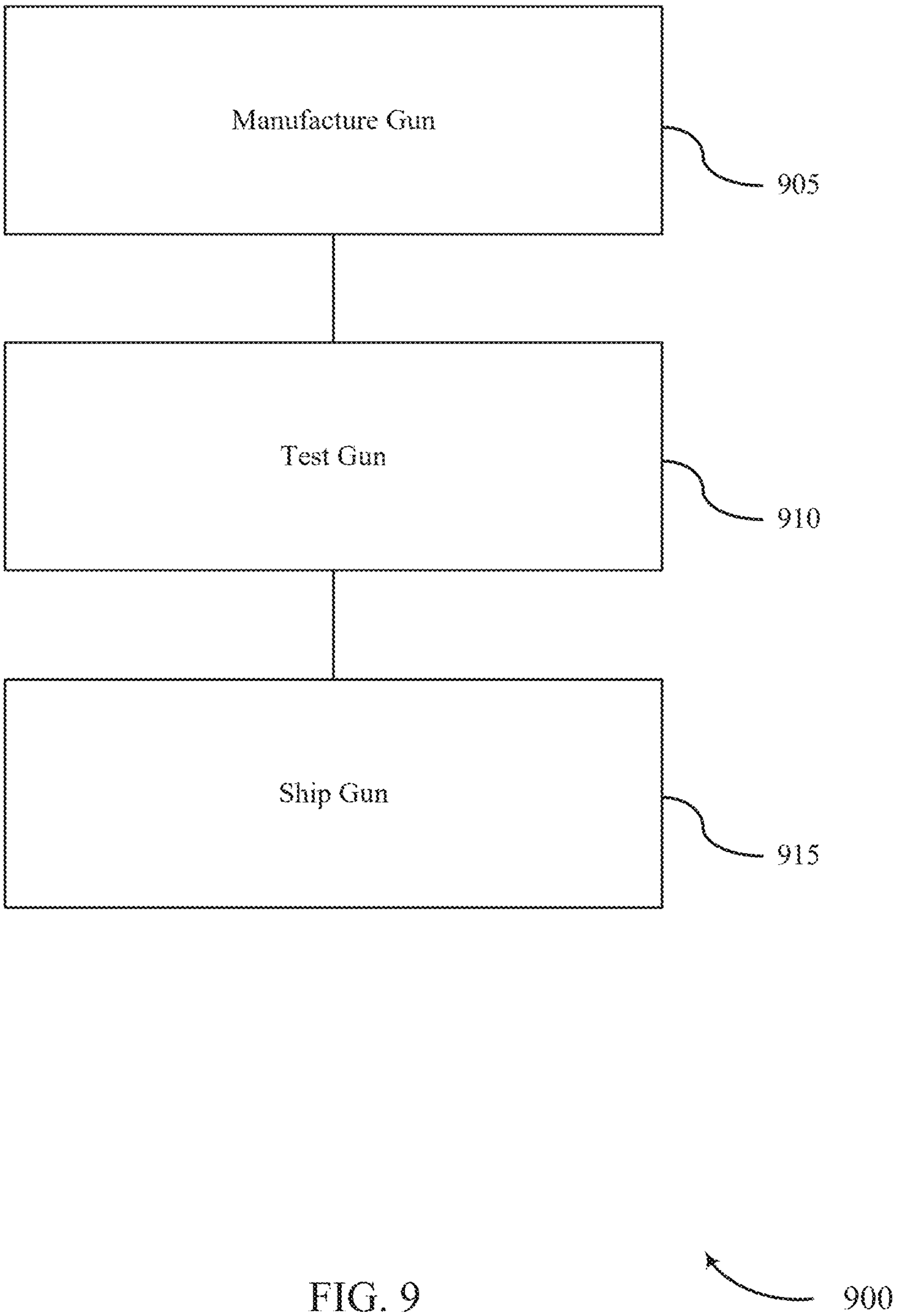
FIG. 9 illustrates an example of a flowchart showing a method of manufacturing a docking station.

FIG. 9 illustrates an example of a flowchart 900 showing a method of manufacturing a device that is capable of communicating with an electromechanical gun. A dock is an example of a device that is capable of communicating with an electromechanical gun. Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Initially, a device manufacturer (or simply "manufacturer") may manufacture a device that is able to implement aspects of the present disclosure (step 905). For example, the manufacturer may cast, machine, cut, shape, or otherwise make parts to be included in the device. Thus, the manufacturer may also design those parts before machining occurs, or the manufacturer may verify designs produced by another entity before machining occurs. Additionally or alternatively, the manufacturer may obtain parts that are manufactured by one or more other entities. Thus, the manufacturer may manufacture the device from components produced entirely by the manufacturer, components produced by other entities, or a combination thereof. Often, the manufacturer will obtain some parts and make other parts that are assembled together to form the device (or a component of the device).

The manufacturer or another entity may generate, store, deploy, or otherwise manage cryptographic data associated with a device. For example, the manufacturer may deploy a cryptographic secret (e.g., a cryptographic key used for deriving a cryptographic key) into memory of the device to support encryption and decryption at the device, the manufacturer may deploy a public cryptographic key into the memory of the device to support verifying cryptographic signatures, the manufacturer may deploy a private cryptographic key into the memory of the device to support generating cryptographic signatures, or the manufacturer may deploy a digital certificate into the memory of the device to cryptographically identify the manufacture or an associated entity.

In some embodiments, the manufacturer also generates identifying information related to the device. For example, the manufacturer may etch (e.g., mechanically or chemically), engrave, or otherwise append identifying information onto the device itself. As another example, the manufacturer may encode at least some identifying information into a data structure that is associated with the device. For instance, the manufacturer may etch a serial number onto the device, and the manufacturer may also populate the serial number (and other identifying information) into a data structure for recording or tracking purposes.

The manufacturer may then test the device (step 910). In some embodiments, the manufacturer tests all of the devices that are manufactured. In other embodiments, the manufacturer tests a subset of the devices that are manufactured. For example, the manufacturer may randomly or semi-randomly select devices for testing, or the manufacturer may select guns for testing in accordance with a predefined pattern (e.g., one test per 5 devices, 10 devices, or 100 devices). Moreover, the manufacturer may test the device in its entirety, or the manufacturer may test a subset of its components. For example, the manufacturer may test the component(s) that it manufactures. As another example, the manufacturer may test newly designed components or randomly selected components. Thus, the manufacturer could test select component(s) of the device, or the manufacturer could test the device as a whole. For example, the manufacturer may test a device manager, which may be implemented by a processor, to verify that a security threshold is satisfied, and the manufacturer may test a display mechanism to verify that a reliability threshold is satisfied.

Thereafter, the manufacturer may ship the device to a customer, a retail location, or a dealer (step 915). For example, a purchaser (also referred to as a "customer") may purchase the device through a digital channel or non-digital channel, and the device may be shipped to the home address of the purchaser. Examples of digital channels include web browsers, mobile applications, and desktop applications, while examples of non-digital channels include ordering via the telephone and ordering via a physical storefront.

Note that while the sequences of the steps performed in the processes described herein are exemplary, the steps can be performed in various sequences and combinations. For example, steps could be added to, or removed from, these processes. Similarly, steps could be replaced or reordered. As an example, the manufacturer may iteratively test components while manufacturing the gun, and therefore perform multiple iterations of steps 905 and 910 either sequentially or simultaneously (e.g., one component may be tested while another component is added to the gun). Thus, the descriptions of these processes are intended to be open ended.

Figure 10:
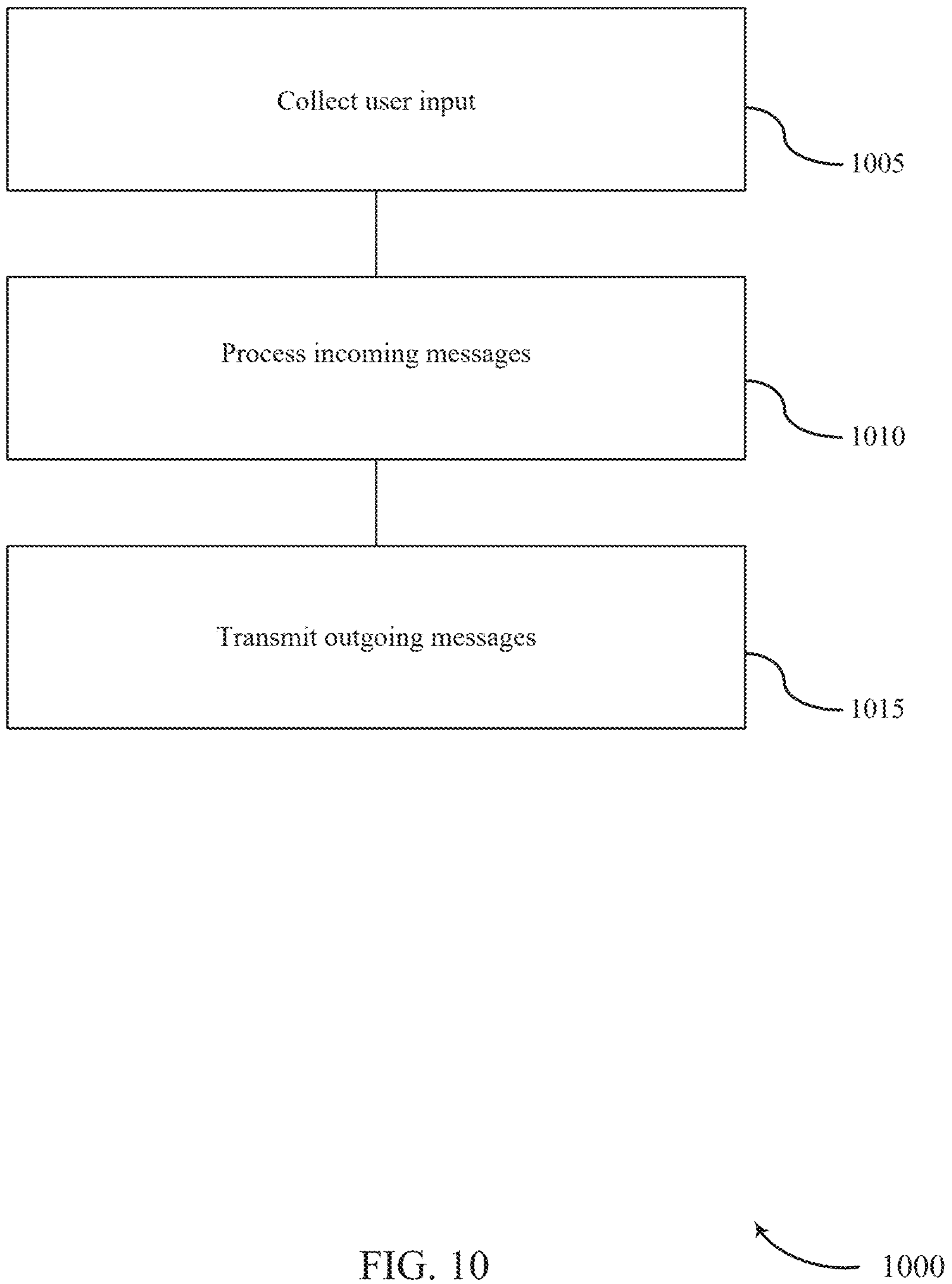
FIG. 10 illustrates an example of a flowchart showing a method of communicating with a gun.

FIG. 10 shows a flowchart illustrating a method 1000 of communicating with an electromechanical gun in accordance with aspects of the present disclosure. The operations of the method 1000 may be implemented by a device or its components as described herein. For example, the operations of the method 1000 may be performed by a device manager, a processor, a dock, or a device configured to communicate with an electromechanical gun. In some examples, a device may execute a set of instructions to control the functional elements of the to perform the described functions. Additionally or alternatively, the device may perform aspects of the described functions using special-purpose hardware.

At step 1005, the device may collect user input. The device may collect the user input based on a user selecting a widget of a touch sensitive display mechanism. The display mechanism may include an array of capacitive touch sensors, and the device may the selection of an interface component (e.g., a button) based on change in capacitance of the array of capacitive touch sensors.

At step 1010, the device may process incoming messages (e.g., outgoing data packets). The incoming messages may be received from an electromechanical gun, and the electromechanical gun may be communicated coupled with the device via a physical electrical interface, such as a USB interface. The device may receive the incoming messages from the electromechanical gun via the physical electrical interface.

At step 1015, the device may transmit outgoing messages (e.g., incoming data packets). The outgoing messages may be transmitted to the electromechanical gun, and the electromechanical gun may be communicated coupled with the device via a physical electrical interface, such as a USB interface. The device may transmit the outgoing messages to the electromechanical gun via the physical electrical interface. In some examples, the device may provide power to the electromechanical gun via the physical electrical interface. For example, the device may implement a power delivery protocol (e.g., USB Power Delivery 2.0, USB Power Delivery 3.1, etc.) and charge the electromechanical gun according to the power deliver protocol.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 11:
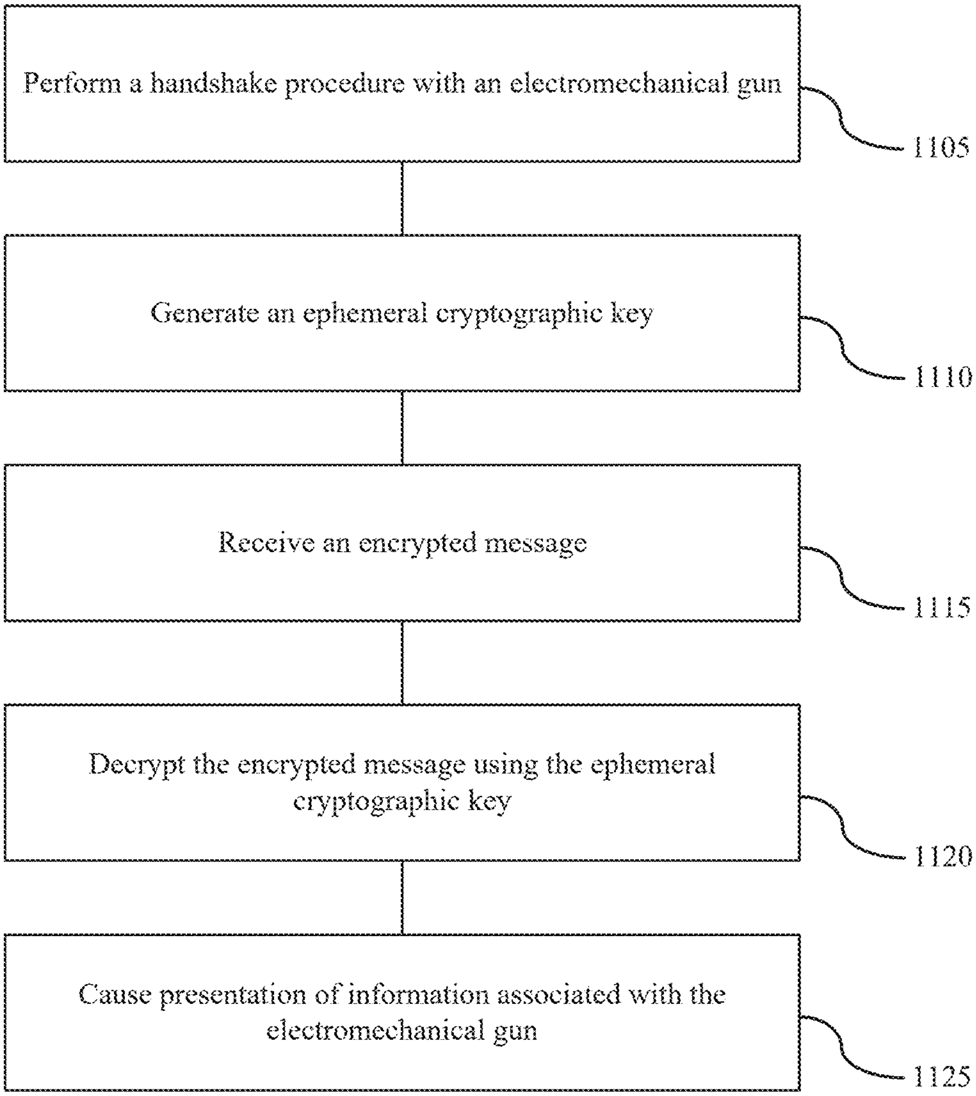
FIG. 11 illustrates an example of a flowchart showing a method of communicating with a docking station.

FIG. 11 shows a flowchart illustrating a method 1100 of communicating with an electromechanical gun in accordance with aspects of the present disclosure. The operations of the method 1100 may be implemented by a device or its components as described herein. For example, the operations of the method 1100 may be performed by a device manager, a processor, a dock, or a device configured to communicate with an electromechanical gun. In some examples, a device may execute a set of instructions to control the functional elements of the to perform the described functions. Additionally or alternatively, the device may perform aspects of the described functions using special-purpose hardware.

At step 1105, the device may perform a handshake procedure with an electromechanical gun. The handshake procedure may include a random cryptographic challenge, digital signature verification, communication protocol agreement, or cryptographic key agreement.

At step 1110, the device may generate an ephemeral cryptographic key. The ephemeral cryptographic key may be generated based on data exchanged during the handshake procedure. For example, the ephemeral cryptographic key may be generated based on applying a key derivation function to data exchanged during the handshake procedure. The data exchanged during the handshake procedure may include a first nonce (e.g., a nonce generated by the device), a second nonce (e.g., a nonce generated by the electromechanical gun), a cryptographic secret, a first DH parameter (e.g., a DH parameter generated by the device), or a second DH parameter (e.g., a DH parameter generated by the electromechanical gun).

At step 1115, the device may receive an encrypted message. The device may receive the encrypted message via an electrical interface, such as a physical interface electronically coupling the device and the electromechanical gun.

At step 1120, the device may decrypt the encrypted message using the ephemeral cryptographic key. Decrypting the encrypting message may reveal information about the electromechanical gun. In other words, the message may include an encrypted version of the information about the electromechanical gun, and the device may decrypt the message to reveal the information about the electromechanical gun. The ephemeral cryptographic key may be an example of a symmetric cryptographic key.

At step 1125, the device may cause presentation of information associated with the electromechanical gun. The information associated with the electromechanical gun may be the information contained in the encrypted message. The device may present the information at a display mechanism, or the device may audibly present the information using a speaker. The information associated with the gun may include a shot count (e.g., the number of shots that have been fired by the gun), a configuration for one or more peripheral components, a battery charge status, a user profile, or the like.

The device may collect user input, generate an additional message containing the user input, and transmit the additional message to the electromechanical gun. The device may encrypt the additional message and transmit the encrypted version of the additional message to the electromechanical gun. In some examples, the device may ratchet the ephemeral cryptographic key based on a key derivation function, encrypt the additional message using the ratcheted cryptographic key, and transmit the encrypted version of the addition message to the electromechanical gun. The device may additionally or alternatively transmit a ratcheted DH parameter to the electromechanical gun.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

Figure 12:
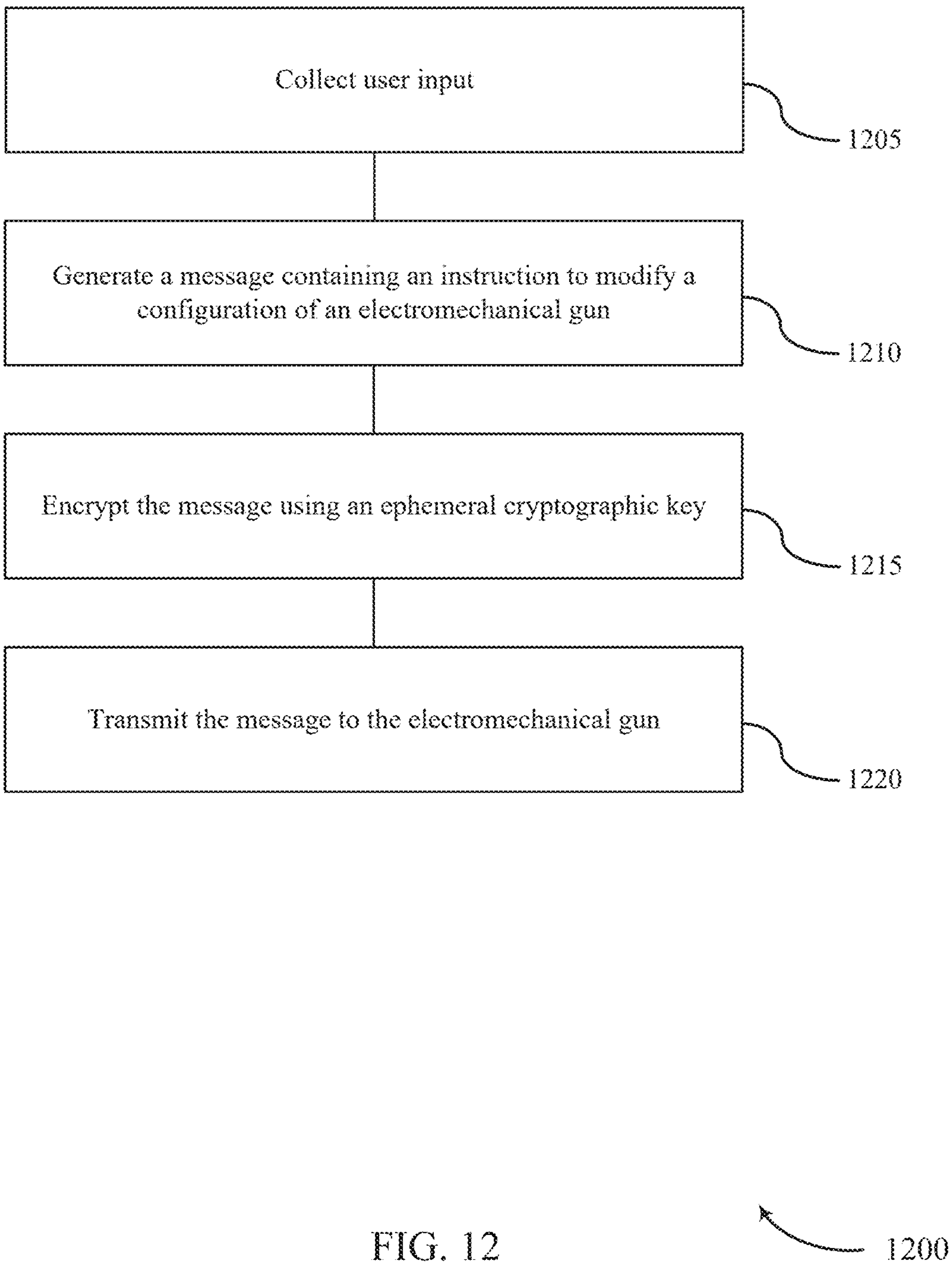
FIG. 12 illustrates an example of a flowchart showing a method of communicating with a docking station.

FIG. 12 shows a flowchart illustrating a method 1200 of communicating with an electromechanical gun in accordance with aspects of the present disclosure. The operations of the method 1200 may be implemented by a device or its components as described herein. For example, the operations of the method 1200 may be performed by a device manager, a processor, a dock, or a device configured to communicate with an electromechanical gun. In some examples, a device may execute a set of instructions to control the functional elements of the to perform the described functions. Additionally or alternatively, the device may perform aspects of the described functions using special-purpose hardware.

At step 1205, the device may collect user input. The user input may be collected based on a user pressing a button, based on the user selecting a widget displayed on a touch sensitive display, based on the user entering text, based on the making a verbal instruction, or the like.

At step 1210, the device may generate a message containing an instruction to modify a configuration of an electromechanical gun. In some examples, the message may contain a change request that indicates a function that a peripheral component of the electromechanical gun is to perform for the user. For example, the message may contain a change request instructing the electromechanical gun to perform a function at a peripheral component when the user is operating the electromechanical gun. The electromechanical gun may determine that the user is operating the gun based on a user authentication procedure, and the electromechanical gun may perform the function at the peripheral component based on the change request.

At step 1215, the device may encrypt the message using an ephemeral cryptographic key. In some examples, the ephemeral cryptographic key may be an example of a symmetric cryptographic key, while in some other examples, the ephemeral cryptographic key may be an example of an asymmetric cryptographic key.

At step 1220, the device may transmit the message to the electromechanical gun. The device may transmit the message to the electromechanical gun via a physical electrical interface or via a wireless electrical interface.

Note that while the sequences of the steps performed in the processes described herein are exemplary, the steps can be performed in various sequences and combinations. For example, steps could be added to, or removed from, these processes. Similarly, steps could be replaced or reordered. Thus, the descriptions of these processes are intended to be open ended.

EXAMPLES

Several aspects of the present disclosure are set forth examples. Note that, unless otherwise specified, all of these examples can be combined with one another. Accordingly, while a feature may be described in the context of a given example, the feature may be similarly applicable to other examples.

In some examples, the techniques described herein relate to a docking station capable of being communicatively coupled with an electromechanical gun, the docking station including: a touch-sensitive display that is capable of collecting input from a user; a power source configured to supply power to the touch-sensitive display; an electrical interface configured to be coupled with the electromechanical gun to form a physical coupling, the physical coupling allowing power to be directed from the power source to the electromechanical gun; and a processor configured to: process the input collected by the touch-sensitive display; process incoming messages received from the electromechanical gun via the electrical interface, and transmit outgoing messages to the electromechanical gun via the electrical interface.

In some examples, the techniques described herein relate to a docking station capable of being communicatively coupled with an electromechanical gun, the docking station including: a display mechanism that is capable of visually conveying information; a power source configured to supply power to the display mechanism; an electrical interface configured to be coupled with the electromechanical gun to form a physical coupling, the physical coupling allowing power to be directed from the power source to the electromechanical gun; and a processor configured to: process incoming messages received from the electromechanical gun via the electrical interface, and transmit outgoing messages to the electromechanical gun via the electrical interface.

In some examples, the techniques described herein relate to a docking station, further including: a physical cradle designed such that the electromechanical gun is loaded therein and maintained in a predetermined stationary position, wherein loading the electromechanical gun into the docking station results in a member of the docking station covering a trigger of the electromechanical gun so as to reduce physical access to the trigger while the electromechanical gun is loaded in the physical cradle.

In some examples, the techniques described herein relate to a docking station, further including: a locking mechanism configured to lock the electromechanical gun to a physical cradle of the docking station, wherein the physical cradle is designed such that the electromechanical gun is loaded therein and maintained in a predetermined stationary position.

In some examples, the techniques described herein relate to a docking station, wherein the locking mechanism includes a biometric locking mechanism that is operable to unlock the electromechanical gun from the physical cradle based on an output of an authentication procedure indicating that a user is authorized to unlock the electromechanical gun.

In some examples, the techniques described herein relate to a docking station, wherein the authentication procedure includes: receiving query data associated with the user; and determining, in response to identifying a biometric data match, that the user is authorized to unlock the electromechanical gun, wherein the biometric data match is identified based on determining that a similarity score satisfies a similarity threshold, wherein the similarity score indicates a similarity of the query data and enrollment data.

In some examples, the techniques described herein relate to a docking station, further including: receiving the output via the electrical interface, wherein the authentication procedure is performed by the electromechanical gun.

In some examples, the techniques described herein relate to a docking station, wherein the electrical interface is a physical electrical interface on a cable, the docking station further including: a cable management system that supports routing the cable: in a first direction from a cable origination location, and in a second direction from the cable origination location, wherein the second direction is opposite the first direction; wherein the cable can be coupled with a complementary electrical interface of the electromechanical gun while allowing access to a biometric sensor of the electromechanical gun.

In some examples, the techniques described herein relate to a docking station, wherein the cable management system further includes: a shroud extending in the first direction from the cable origination location and in the second direction from the cable origination location, wherein the shroud is capable of enveloping a length of the cable circumferentially such that at least 50 percent of the length of the cable is contacting the shroud.

In some examples, the techniques described herein relate to a docking station, wherein the processor is further configured to: retrieve a private asymmetric cryptographic key from memory that is communicatively coupled with the processor; generate a digital signature using the private asymmetric cryptographic key; and transmit the digital signature to the electromechanical gun via the electrical interface.

In some examples, the techniques described herein relate to a docking station, wherein the processor is further configured to: receive, via the electrical interface, a first message containing a random value, wherein the digital signature includes an encrypted version of the random value; and receive, via the electrical interface, a second message based on the digital signature.

In some examples, the techniques described herein relate to a docking station, wherein the processor is further configured to: receive an encrypted message over the electrical interface; decrypt the encrypted message using a cryptographic key to produce human-comprehensible information associated with the electromechanical gun; and display the human-comprehensible information at the display mechanism.

In some examples, the techniques described herein relate to a docking station, further including: a hardware-implemented security module communicatively coupled with the processor, the hardware-implemented security module containing memory that stores a cryptographic key.

In some examples, the techniques described herein relate to a docking station, further including: a removable battery pack coupled with the power source, wherein the power source is configured to provide power to the removable battery pack and the display mechanism.

In some examples, the techniques described herein relate to a docking station, further including: a speaker coupled with the processor, wherein the speaker is configured to generate a spoken instruction that directs the user to provide biometric data to a biometric sensor of the electromechanical gun that is coupled with the electrical interface.

In some examples, the techniques described herein relate to a docking station, further including: a fan coupled with the processor; and a vent including a pattern of holes in a bottom surface of the docking station, wherein the fan is configured to direct air away from the processor and through the vent.

In some examples, the techniques described herein relate to a docking station, wherein the display mechanism includes a capacitive touch-sensitive display that is capable of collecting input from a user.

In some examples, the techniques described herein relate to a method of electronically communicating with an electromechanical gun, the method including: performing a handshake procedure with the electromechanical gun by—receiving a first message that includes a first nonce generated by the electromechanical gun; generating a second nonce in response to receiving the first message, and transmitting, to the electromechanical gun, a second message that includes a digital signature and the second nonce; receiving, from the electromechanical gun, a third message that includes an encrypted version of a secret string; decrypting the encrypted secret string using a private cryptographic key to produce an unencrypted version of the secret string; generating an ephemeral symmetric cryptographic key based on the handshake procedure, wherein the ephemeral symmetric cryptographic key is based on the first nonce, the second nonce, and the unencrypted version of the secret string; receiving an encrypted message from the electromechanical gun; decrypting the encrypted message using the ephemeral symmetric cryptographic key to produce human-comprehensible information associated with the electromechanical gun; and causing presentation of the human-comprehensible information at a display mechanism.

In some examples, the techniques described herein relate to a method of electronically communicating with an electromechanical gun, the method including: performing a handshake procedure with the electromechanical gun; generating an ephemeral cryptographic key based on the handshake procedure, wherein the ephemeral cryptographic key is based on data exchanged during the handshake procedure; receiving an encrypted message in response to the handshake procedure; decrypting the encrypted message using the ephemeral cryptographic key to produce information associated with the electromechanical gun; and causing presentation of the information associated with the electromechanical gun at a display mechanism.

In some examples, the techniques described herein relate to a method, wherein the handshake procedure includes: receiving a first message including a first nonce generated by the electromechanical gun; transmitting, based on the first message, a second message including an encrypted version of the first nonce, an encrypted version of a second nonce, and an encrypted version of a first parameter; receiving, based on the second message, a third message including a second parameter; and generating a secret string based on an unencrypted version of the first parameter and the second parameter; wherein the generating the ephemeral cryptographic key is based on the first nonce, the second nonce, and the secret string, and wherein the ephemeral cryptographic key includes a symmetric cryptographic key.

In some examples, the techniques described herein relate to a method, wherein the handshake procedure includes: receiving a first message including a first nonce generated by the electromechanical gun; transmitting, based on the first message, a second message including a digital signature and a second nonce; receiving, based on the second message, a third message including an encrypted version of a secret string; and decrypting the encrypted version of the secret string using a private cryptographic key to produce an unencrypted version of the secret string; wherein the generating the ephemeral cryptographic key is based on the first nonce, the second nonce, and the unencrypted version of the secret string, and wherein the ephemeral cryptographic key includes a symmetric cryptographic key.

In some examples, the techniques described herein relate to a method, further including: generating a second message including an instruction to modify a configuration of a peripheral component of the electromechanical gun; encrypting the second message using the ephemeral cryptographic key to produce an encrypted version of the second message; and transmitting the encrypted version of the second message to the electromechanical gun, wherein the second message is configured to cause the electromechanical gun to modify the configuration of the peripheral component.

In some examples, the techniques described herein relate to a method, further including: collecting user input at the display mechanism, wherein the instruction to modify the configuration of the peripheral component is based on the user input.

In some examples, the techniques described herein relate to a method, wherein the user input indicates a function that a user wants the electromechanical gun to perform.

In some examples, the techniques described herein relate to a method, further including: prompting, in response to the handshake procedure, a user to provide biometric data; and determining that the user is authorized to operate the electromechanical gun, wherein the receiving the encrypted message is further based on the determining that the user is authorized to operate the electromechanical gun.

In some examples, the techniques described herein relate to a method, further including: receiving query data associated with the user in response to the prompting the user to provide the biometric data; and determining that a similarity score representing a similarity of the query data and enrollment data satisfies a similarity threshold, wherein the determining that the user is authorized to operate the electromechanical gun is based on the similarity score satisfying the threshold.

In some examples, the techniques described herein relate to a method, further including: receiving an encrypted authorization message in response to the prompting the user to provide the biometric data; and decrypting the encrypted authorization message using a cryptographic key to reveal an indication that the user is authorized to operate the electromechanical gun, wherein the determining that the user is authorized to operate the electromechanical gun is based on indication.

In some examples, the techniques described herein relate to a method, wherein the prompting the user includes: generating a text-based instruction at the display mechanism directing the user to provide the biometric data at a biometric sensor; or generating a speech-based instruction at a speaker directing the user to provide the biometric data at the biometric sensor.

In some examples, the techniques described herein relate to a method, wherein the information associated with the electromechanical gun includes a peripheral component configuration, the method further including: identifying a selection of a widget depicted by the display mechanism, wherein the selection of the widget indicates a preferred configuration for a peripheral component of the electromechanical gun; generating a configuration message in response to the selection of the widget, wherein the message contains a new peripheral component configuration that incorporates the preferred configuration for the peripheral component of the electromechanical gun; and transmitting the configuration message to the electromechanical gun, wherein the configuration message is configured to cause the electromechanical gun to modify the peripheral component configuration.

In some examples, the techniques described herein relate to a method, further including: encrypting the configuration message using the ephemeral cryptographic key to produce an encrypted version of the configuration message, wherein the transmitting the configuration message includes transmitting the encrypted version of the configuration message.

In some examples, the techniques described herein relate to a method, wherein the causing presentation of the information includes: causing a user interface to be generated at the display mechanism based on an output of a user authentication procedure, wherein the output indicates that a user is authorized to operate the electromechanical gun.

In some examples, the techniques described herein relate to a method, wherein the output is based on a similarity score satisfying a similarity threshold, wherein the similarity score represents a similarity between query data and enrollment data.

In some examples, the techniques described herein relate to a method, wherein the generating the ephemeral cryptographic key includes: performing a key derivation function to produce an additional secret string as output, wherein the first nonce, the second nonce, and the secret string are used as input to the key derivation function; and performing an additional key derivation function to produce the ephemeral cryptographic key as output, wherein the additional secret string is used as input to the additional key derivation function.

In some examples, the techniques described herein relate to a method, wherein the generating the ephemeral cryptographic key includes: performing a key derivation function to produce an additional secret string as output, wherein the first nonce, the second nonce, and the secret string are used as input to the key derivation function; and performing an additional key derivation function to produce the ephemeral cryptographic key as output, wherein the additional secret string is used as input to the additional key derivation function.

In some examples, the techniques described herein relate to a method, wherein the first parameter includes a first Diffie-Hellman parameter and the second parameter includes a second Diffie-Hellman parameter.

REMARKS

The Detailed Description provided herein, in connection with the drawings, describes example configurations and does not represent all the examples that may be implemented or that are within the scope of the claims. The term "example" used herein means "serving as an illustration or instance," and not "a preferred example."

The functions described herein may be implemented with a controller. A controller may include a device manager, a special-purpose processor, a general-purpose processor, a digital signal processor (DSP), a CPU, a graphics processing unit (GPU), a microprocessor, a tensor processing unit (TPU), a neural processing unit (NPU), an image signal processor (ISP), a hardware security module (HSM), an ASIC, a programmable logic device (such as an FPGA), a state machine, a circuit (such as a circuit including discrete hardware components, analog components, or digital components), or any combination thereof. Some aspects of a controller may be programmable, while other aspects of a control may not be programmable. In some examples, a digital component of a controller may be programmable (such as a CPU), and in some other examples, an analog component of a controller may not be programmable (such as a differential amplifier).

In some cases, instructions or code for the functions described herein may be stored on or transmitted over a computer-readable medium, and components implementing the functions may be physically located at various locations. Computer-readable media includes both non-transitory computer storage media and communication media. A non-transitory storage medium may be any available medium that may be accessed by a computer or component. For example, non-transitory computer-readable media may include RAM, SRAM, DRAM, ROM, EEPROM, flash memory, magnetic storage devices, or any other non-transitory medium that may be used to carry and/or store program code means in the form of instructions and/or data structures. The instructions and/or data structures may be accessed by a special-purpose processor, a general-purpose processor, a manager, or a controller. A computer-readable media may include any combination of the above, and a compute component may include computer-readable media.

In the context of the specification, the term "left" means the left side of the gun when the gun is held in an upright position, where the term "upright position" generally refers to a scenario in which the gun is oriented as if in a high-ready position with the barrel roughly parallel to the ground. The term "right" means the right side of the gun when the gun is held in the upright position. The term "front" means the muzzle end (also referred to as the "distal end") of the gun, and the term "back" means the grip end (also referred to as the "proximal end") of the gun. The terms "top" and "bottom" mean the top and bottom of the gun as the gun is held in the upright position. The relative positioning terms such as "left," "right," "front," and "rear" are used to describe the relative position of components. The relative positioning terms are not intended to be limiting relative to a gravitational orientation, as the relative positioning terms are intended to be understood in relation to other components of the gun, in the context of the drawings, or in the context of the upright position described above.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method of electronically communicating with an electromechanical gun, the method comprising:

performing a handshake procedure with the electromechanical gun by— receiving a first message that includes a first nonce generated by the electromechanical gun;

generating a second nonce in response to receiving the first message; and transmitting, to the electromechanical gun, a second message that includes a digital signature and the second nonce;

receiving, from the electromechanical gun, a third message that includes an encrypted secret string;

decrypting the encrypted secret string using a private key to produce an unencrypted secret string;

generating an ephemeral symmetric encryption key based on the handshake procedure, wherein the ephemeral symmetric encryption key is based on the first nonce, the second nonce, and the unencrypted secret string;

receiving an encrypted message from the electromechanical gun;

decrypting the encrypted message using the ephemeral symmetric encryption key to produce human-comprehensible information associated with the electromechanical gun; and causing presentation of the human-comprehensible information.

2. A method of electronically communicating with an electromechanical gun, the method comprising:

performing a handshake procedure with the electromechanical gun;

generating an ephemeral encryption key based on the handshake procedure, wherein the ephemeral encryption key is based on data received during the handshake procedure;

receiving an encrypted message in response to the handshake procedure;

decrypting the encrypted message using the ephemeral encryption key to produce information associated with the electromechanical gun; and generating a user interface at a display, the user interface including the information associated with the electromechanical gun.

3. The method of claim 2, wherein the handshake procedure comprises:

receiving a first message comprising a first nonce generated by the electromechanical gun;

transmitting, based on the first message, a second message comprising an encrypted version of the first nonce, an encrypted second nonce, and an encrypted version of a first Diffie-Hellman parameter;

receiving a third message comprising a second Diffie-Hellman parameter; and generating a secret string based on an unencrypted version of the first Diffie-Hellman parameter and the second Diffie-Hellman parameter;

wherein the generating the ephemeral encryption key is based on the first nonce, the encrypted second nonce, and the secret string.

4. The method of claim 2, wherein the handshake procedure comprises:

receiving a first message comprising a first nonce generated by the electromechanical gun;

transmitting, based on the first message, a second message comprising a digital signature and a second nonce;

receiving, based on the second message, a third message comprising an encrypted secret string; and decrypting the encrypted secret string using a private key to produce an unencrypted version of the encrypted secret string;

wherein the generating the ephemeral encryption key is based on the first nonce, the second nonce, and the decrypted secret string, and wherein the ephemeral encryption key is a symmetric key.

5. The method of claim 2, further comprising:

generating a second encrypted message using the ephemeral encryption key; and transmitting the second encrypted message to the electromechanical gun.

6. The method of claim 5, further comprising:

collecting, at the user interface, user-input indicating a selected configuration for a component of the electromechanical gun;

wherein the generating the second encrypted message is in response to the user-input.

7. The method of claim 6, wherein the selected configuration indicates a default behavior for an electronic sight of the electromechanical gun.

8. The method of claim 2, further comprising:

prompting a user to provide biometric data; and receiving, based on the user providing biometric data, an additional encrypted message from the electromechanical gun.

9. The method of claim 8, wherein the additional encrypted message includes information about the electromechanical gun.

10. The method of claim 8, wherein the prompting the user comprises:

generating a text-based instruction at the display directing the user to provide the biometric data at a biometric sensor; or generating a speech-based instruction at a speaker directing the user to provide the biometric data at the biometric sensor.

* * * * *